US012627962B2

(12) United States Patent

Turiello

(10) Patent No.: US 12,627,962 B2

(45) Date of Patent: *May 12, 2026

---

(54) METHODS AND SYSTEMS OF NETWORK ACCESS POINT BASED COMMUNICATION BETWEEN EMERGENCY PERSONNEL IN A STRUCTURE HAVING A FIREFIGHTER AIR REPLENISHMENT SYSTEM IMPLEMENTED THEREIN

(71) Applicant: Rescue Air Systems, Inc., San Carlos, CA (US)

(72) Inventor: Anthony J. Turiello, Westlake, TX (US)

(73) Assignee: Rescue Air Systems Inc., San Carlos, CA (US)

( * ) Notice: Subject to any disclaimer, the term of this patent is extended or adjusted under 35 U.S.C. 154(b) by 102 days.

This patent is subject to a terminal disclaimer.

(21) Appl. No.: 18/733,406

(22) Filed: Jun. 4, 2024

(65) Prior Publication Data

US 2025/0016538 A1 Jan. 9, 2025

Related U.S. Application Data

(60) Provisional application No. 63/525,316, filed on Jul. 6, 2023.

(51) Int. Cl.
| | |
|---|---|
| *G08B 21/00* | (2006.01) |
| *G08B 21/02* | (2006.01) |

(Continued)

(52) U.S. Cl.
CPC .............. *H04W 4/90* (2018.02); *G08B 21/02* (2013.01); *H04L 12/2856* (2013.01)

(58) Field of Classification Search
CPC .......... A62B 9/006; A62B 7/02; A62B 15/00; A62B 27/00; A62B 13/00; A62B 7/00; A62B 11/00; A62B 25/00; A62B 7/10; A62B 7/12; A62B 18/006; A62B 18/08; A62B 9/003; A62B 9/02; A62B 1/00; A62B 3/00; A62B 5/00; A62B 9/00;

(Continued)

(56) References Cited

U.S. PATENT DOCUMENTS

| | | | | |
|---|---|---|---|---|
| 7,353,824 B1 * | 4/2008 | Forsyth | ................. | A62B 9/006 |
| | | | | 128/204.22 |
| 12,418,633 B2 * | 9/2025 | Turiello | .................. | A62B 7/12 |

(Continued)

*Primary Examiner* — Daniel Previl

(74) *Attorney, Agent, or Firm* — Foley & Lardner LLP

(57) ABSTRACT

Methods and/or a system of network access point based improved communication between emergency personnel within a safety system of a structure having a fixed piping system installed therewithin to supply breathable air from a source across the safety system are disclosed. In accordance therewith, a network access point within the safety system is automatically activated upon detection of an emergency state within the safety system. The emergency state affects supply of the breathable air to the emergency personnel. Access to communication through a computer network of the safety system is provided to one or more data processing device(s) associated with the emergency personnel during the emergency state in accordance with the automatic activation of the network access point.

20 Claims, 15 Drawing Sheets

(51) Int. Cl.
    *H04L 12/28*     (2006.01)
    *H04W 4/90*     (2018.01)

(58) Field of Classification Search
    CPC ......... A62B 17/00; A62B 18/00; A62B 19/00;
G08B 21/02; G08B 13/1965; G08B
25/016; G08B 27/008; G08B 31/00;
G08B 21/0453; G08B 21/14; G08B
21/182; G08B 25/10; G08B 21/043;
G08B 21/0446; G08B 5/36; G08B
21/0461; G08B 21/12; G08B 25/009;
G08B 7/068; G08B 21/0227; G08B
21/0261; G08B 21/0269; G08B 25/005;
G08B 7/06; G08B 1/00; G08B 5/00;
G08B 3/00; G08B 6/00; G08B 7/00;
G08B 9/00; G08B 13/00; G08B 15/00;
G08B 17/00; G08B 19/00; G08B 21/00;
G08B 25/00; G08B 23/00; G08B 26/00;
G08B 27/00; G08B 29/00; F24F 11/30;
F24F 11/52; F24F 11/58; F24F 11/63;
F24F 11/77; F24F 11/79; F24F 2110/10;
F24F 2110/20; F24F 2110/50; F24F
2120/00; F24F 2120/10; F24F 2120/20;
F24F 11/72; F24F 13/0218; F24F 7/06;
F24F 7/08; F24F 8/10; G05B 15/02;
G05B 19/042; G05B 2219/2614; G05B
2219/2642; H05B 47/105; H05B 47/11;
H05B 47/115; H05B 47/19; H05B
47/196; H05B 47/1985; Y02B 20/40;
Y02B 30/70; A61M 2202/0208; A61M
2205/3553; A61M 2205/3592; A61M
16/06; A61M 16/204; A61M 16/209;
A61M 2016/0027; A61M 2016/0039;
A61M 2202/0007; A61M 2205/14; A61M
2205/502; A61M 2205/581; A61M
2209/06; A61M 2240/00; A61M 16/00;
A61M 16/0051; A61M 16/024; A61M
16/0605; A61M 16/0816; A61M 16/0866;
A61M 16/12; A61M 16/201; A61M
16/203; A61M 16/208; A61M 2205/15;
A61M 2205/332; A61M 2205/3344;
A61M 2205/3375; A61M 2205/3584;
A61M 2205/583; A61M 2205/584; A61M
2205/6009; A61M 2205/6018; A61M
2205/6027; A61M 2205/6036; A61M
2205/80; A61M 2205/8225; A61M
2209/084; A61M 2230/432; A61M 1/00;
A61M 3/00; A61M 5/00; A61M 9/00;
G01C 21/206; G01C 21/3407; G01C
21/20; G01C 23/00; G06F 2113/08; G06F
2113/14; G06F 30/13; G06F 30/20; G06F
30/27; G06F 30/28; G06F 16/9538; G06F
16/9577; G06F 1/00; G06F 3/00; G06F
5/00; G06F 7/00; G06F 9/00; G06F 8/00;
G06N 3/006; G06N 3/088; G06N 5/04;
G06N 3/00; G06N 5/00; G06N 7/00;
G06N 10/00; G06N 20/00; G06N 99/00;
B64C 13/20; B64D 45/0015; B64D
45/0031; B64D 45/0034; B64D 45/0053;
B64D 45/0059; B64D 2011/0046; B64D
25/00; G01S 11/06; G01S 13/878; G01S
5/0278; G01S 19/46; G01S 19/48; G01S
5/0258; G01S 1/00; G01S 3/00; G01S
5/00; G01S 7/00; G01S 11/00; G01S
13/00; G01S 17/00; G01S 15/00; G01S
19/00; G01S 2201/00; G01S 2205/00;
G07C 5/008; G07C 9/00896; G07C
9/257; G07C 9/28; G07C 9/29; G07C
1/00; G07C 3/00; G07C 5/00; G07C
7/00; G07C 9/00; G07C 11/00; G07C
13/00; G07C 15/00; G07C 2205/00;
G07C 2209/00; Y02T 50/40; A61H
2201/1253; A61H 2201/50; A61H
2201/5025; A61H 2201/5048; A61H
2201/5061; A61H 2201/5071; A61H
31/00; A61H 31/005; A61L 2209/111;
A61L 2209/14; A61L 9/20; A61L
2209/12; A61L 2209/134; A61L 2209/15;
A61L 2209/16; A61L 2209/22; A61L
9/014; A61L 9/16; B60Q 9/00; E21F
11/00; E21F 13/004; G06Q 50/265;
G06Q 90/205; G06Q 20/3227; G06Q
20/363; G06Q 20/4014; G06Q 30/0201;
G06Q 30/0251; G06Q 30/0282; G06Q
10/00; G06Q 20/00; G06Q 30/00; G06Q
40/00; G06Q 50/00; G06Q 90/00; G06Q
99/00; G06Q 2220/00; G06Q 2230/00;
G06Q 2240/00; G06Q 2250/00; G16Y
40/50; H04L 12/10; H04L 12/1895; H04L
12/2856; H04L 12/18; H04L 12/189;
H04L 12/28; H04L 12/2854; H04L 41/22;
H04L 43/10; H04L 65/1053; H04L
65/1056; H04L 67/12; H04L 63/083;
H04L 63/0861; H04L 1/00; H04L 5/00;
H04L 7/00; H04L 9/00; H04L 12/00;
H04L 13/00; H04L 15/00; H04L 17/00;
H04L 19/00; H04L 21/00; H04N 23/60;
H04N 7/181; H04N 7/183; H04N 7/188;
H04W 4/90; H04W 4/027; H04W 4/12;
H04W 4/14; H04W 4/80; H04W 84/12;
H04W 4/029; H04W 76/50; H04W 4/02;
H04W 64/00; H04W 88/005; H04W
24/10; H04W 64/006; H04W 12/06;
H04W 24/00; H04W 4/021; H04W 4/024;
H04W 88/16; H04W 4/00; H04W 12/00;
H04W 16/00; H04W 8/00; H04W 28/00;
H04W 36/00; H04W 40/00; H04W 48/00;
H04W 52/00; H04W 56/00; H04W 60/00;
H04W 68/00; H04W 72/00; H04W 74/00;
H04W 76/00; H04W 80/00; H04W 84/00;
H04W 88/00; H04W 92/00; H04W 99/00;
B01D 2273/26; B01D 2273/30; B01D
2279/40; B01D 46/0028; B01D 46/0043;
B01D 46/4263; B01D 46/4272; B01D
46/444; B01D 46/446; B01D 46/448;
B01D 46/46; H04M 3/42314; H04M
3/56; H04M 7/006; H04M 11/04; H04M
1/66; H04M 2250/04; H04M 2250/14;
H04M 1/00; H04M 3/00; H04M 5/00;
H04M 7/00; H04M 9/00; H04M 11/00;
H04M 13/00; H04M 1/72412; H04M
1/72418; B60R 21/0136; B60R 2325/205;
B60R 2325/304; B60R 25/02; B60R
25/042; B60R 25/08; B60R 25/102; B60R
25/33; B60R 1/00; B60R 3/00; B60R
5/00; B60R 7/00; B60R 9/00; B60R
11/00; B60R 13/00; B60R 15/00; B60R
16/00; B60R 17/00; G08G 1/205; G08G
1/00; G08G 3/00; G08G 5/00; G08G
7/00; G08G 9/00; G08G 99/00; G07F 7/0886; G07F 1/00; G07F 5/00; G07F 7/00; G07F 11/00; G07F 9/00; G07F 13/00; G07F 15/00; G07F 17/00; G07F 19/00; B60T 7/18; B60T 8/4266; B60T 8/4863; B60T 1/00; B60T 5/00; B60T 7/00; B60T 8/00; B60T 10/00; B60T 11/00; B60T 13/00; B60T 15/00; B60T 17/00; B60T 2201/00; B60T 2210/00; B60T 2220/00; B60T 2230/00; B60T 2240/00; B60T 2250/00; B60T 2260/00; B60T 2270/00; B66B 11/024; F16L 3/26; G01K 17/04; B60W 2556/50; B60W 50/029; B60W 10/00; B60W 20/00; B60W 30/00; B60W 40/00; B60W 50/00; B60W 60/00; B60W 2300/00; B60W 2400/00; B60W 2420/00; B60W 2422/00; B60W 2510/00; B60W 2520/00; B60W 2530/00; B60W 2540/00; B60W 2552/00; B60W 2554/00; B60W 2555/00; B60W 2556/00; B60W 2710/00; B60W 2720/00; B60W 2754/00; B60W 2756/00; B60W 2900/00; F02D 41/021; F02D 41/042; F02D 1/00; F02D 3/00; F02D 7/00; F02D 9/00; F02D 11/00; F02D 13/00; F02D 15/00; F02D 17/00; F02D 19/00; F02D 21/00; F02D 23/00; F02D 25/00; F02D 27/00; F02D 28/00; F02D 29/00; F02D 31/00; F02D 33/00; G06K 19/0702; G06K 19/0723; G06K 19/07703; G06K 19/07711; G06K 1/00; G06K 3/00; G06K 5/00; G06K 7/00; G06K 11/00; G06K 13/00

USPC ......... 340/540, 545.2, 530, 539.1, 435, 474, 340/488, 539.22, 568.1

See application file for complete search history.

(56)                    References Cited

U.S. PATENT DOCUMENTS

| 2024/0001166 A1* | 1/2024 | Turiello | ................. A62B 9/006 |
| 2024/0001170 A1* | 1/2024 | Turiello | ................. A62B 15/00 |
| 2024/0005715 A1* | 1/2024 | Turiello | ............. G07C 9/00896 |

* cited by examiner

EXAMPLE ANOTHER COMPRESSED AIR SOURCE 109 = AIR COMPRESSOR 130

FIG. 1B

OUTPUTS 610

INPUT 612

ELECTROCHEMICAL GAS SENSORS 616

DEW POINT SENSOR 618

AUDIO ALARM 620

PID SENSOR 604

FLOW SENSOR 602

ALARM RELAYS 626

IR SENSOR 608

MOS SENSOR 606

CONNECTORS 624

POWER INPUT 622

AIR QUALITY ANALYSIS DEVICE 105

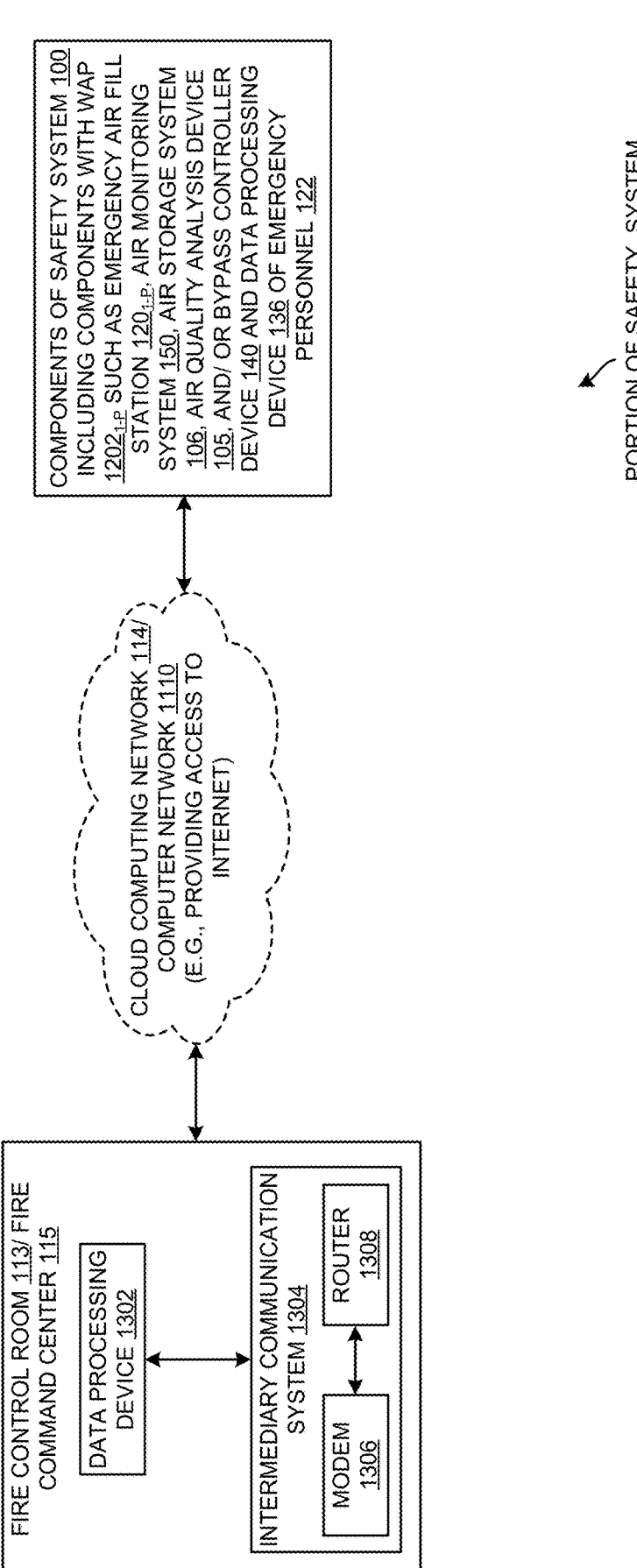

COMPONENTS OF SAFETY SYSTEM 100 INCLUDING COMPONENTS WITH WAP 1202$_{1-P}$ SUCH AS EMERGENCY AIR FILL STATION 120$_{1-P}$, AIR MONITORING SYSTEM 150, AIR STORAGE SYSTEM 106, AIR QUALITY ANALYSIS DEVICE 105, AND/OR BYPASS CONTROLLER DEVICE 140 AND DATA PROCESSING DEVICE 136 OF EMERGENCY PERSONNEL 122

CLOUD COMPUTING NETWORK 114/ COMPUTER NETWORK 1110 (E.G., PROVIDING ACCESS TO INTERNET)

FIRE CONTROL ROOM 113/ FIRE COMMAND CENTER 115

DATA PROCESSING DEVICE 1302

INTERMEDIARY COMMUNICATION SYSTEM 1304

ROUTER 1308

MODEM 1306

PORTION OF SAFETY SYSTEM 100

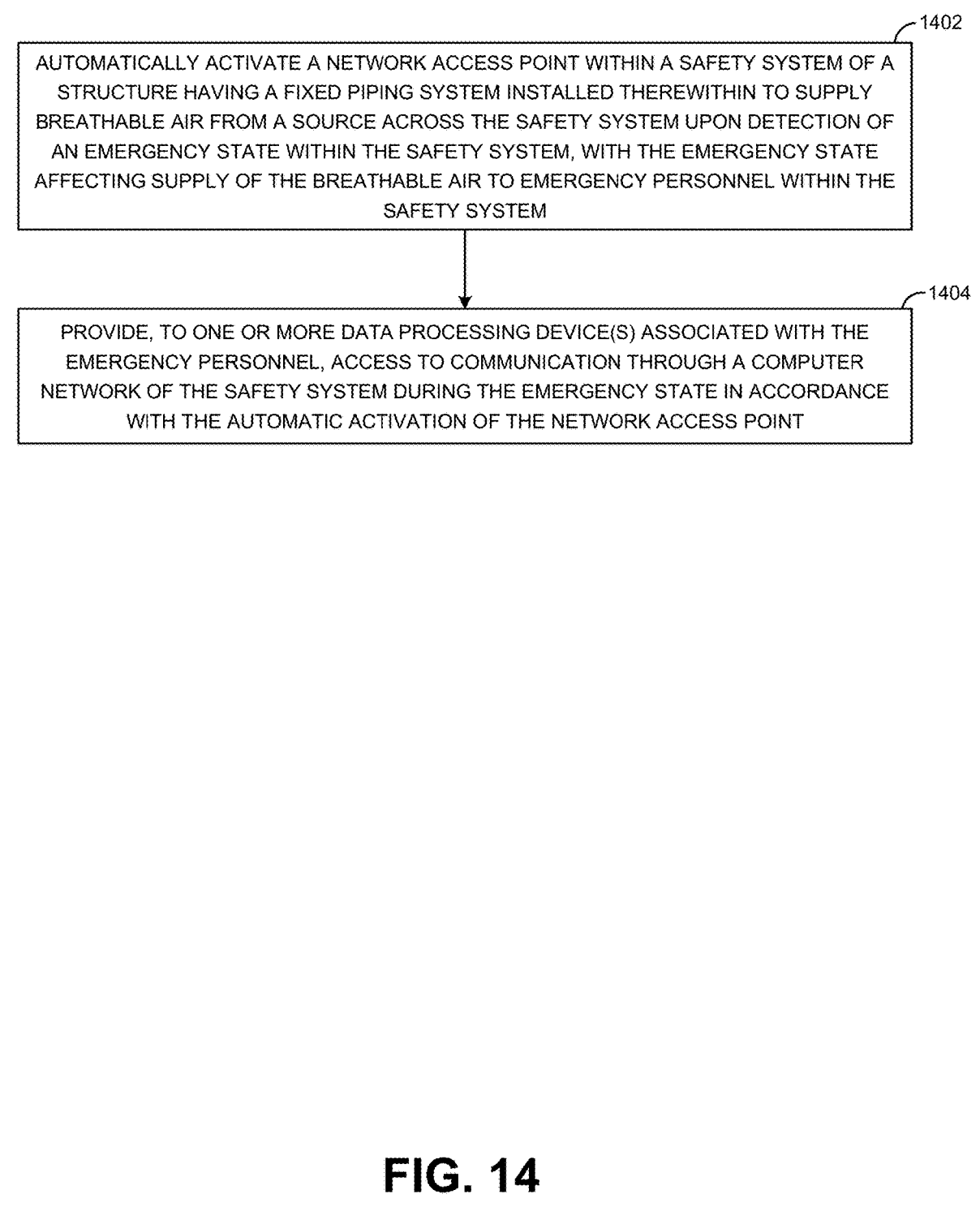

AUTOMATICALLY ACTIVATE A NETWORK ACCESS POINT WITHIN A SAFETY SYSTEM OF A STRUCTURE HAVING A FIXED PIPING SYSTEM INSTALLED THEREWITHIN TO SUPPLY BREATHABLE AIR FROM A SOURCE ACROSS THE SAFETY SYSTEM UPON DETECTION OF AN EMERGENCY STATE WITHIN THE SAFETY SYSTEM, WITH THE EMERGENCY STATE AFFECTING SUPPLY OF THE BREATHABLE AIR TO EMERGENCY PERSONNEL WITHIN THE SAFETY SYSTEM

1404

PROVIDE, TO ONE OR MORE DATA PROCESSING DEVICE(S) ASSOCIATED WITH THE EMERGENCY PERSONNEL, ACCESS TO COMMUNICATION THROUGH A COMPUTER NETWORK OF THE SAFETY SYSTEM DURING THE EMERGENCY STATE IN ACCORDANCE WITH THE AUTOMATIC ACTIVATION OF THE NETWORK ACCESS POINT

FIG. 14

METHODS AND SYSTEMS OF NETWORK ACCESS POINT BASED COMMUNICATION BETWEEN EMERGENCY PERSONNEL IN A STRUCTURE HAVING A FIREFIGHTER AIR REPLENISHMENT SYSTEM IMPLEMENTED THEREIN

CROSS REFERENCE TO RELATED APPLICATION

This application is a conversion application of, and claims priority to, U.S. Provisional Patent Application No. 63/525,316 titled "Automatic WiFi Hotspot Activation Through Emergency Air Panels of a Building Structure During an Emergency to Improve Communications Between Emergency Responders," filed on Jul. 6, 2023. The contents of the aforementioned application are incorporated herein by reference in entirety thereof.

FIELD OF TECHNOLOGY

This disclosure relates generally to emergency systems and, more particularly, to methods and/or a system of network access point based improved communication between emergency personnel in a safety system of a structure having breathable air supplied thereacross.

BACKGROUND

A structure (e.g., a vertical building, a horizontal building, a tunnel, marine craft, a mine) may have a Firefighter Air Replenishment System (FARS) implemented therein. The FARS may be employed to provide pure and safe breathable air to emergency personnel and/or maintenance personnel associated therewith. During an emergency situation such as a fire, smoke, leakage of the breathable air at one or more levels of the structure and/or contamination of the breathable air at the one or more levels, the emergency personnel may need to communicate efficiently with one another. Further, locations within the structure across which the emergency personnel may pass through and/or locations associated with components (e.g., emergency air fill stations providing access to the breathable air) of the FARS leveraged by the emergency personnel may provide for poor connectivity to a computer network associated with the FARS to data processing devices associated with the emergency personnel.

SUMMARY

Disclosed are methods and/or a system of network access point based improved communication between emergency personnel in a safety system of a structure having breathable air supplied thereacross.

In one aspect, a method of a safety system of a structure having a fixed piping system installed therewithin to supply breathable air from a source across the safety system is disclosed. The method includes automatically activating a network access point within the safety system upon detecting an emergency state within the safety system. The emergency state affects supply of the breathable air to emergency personnel within the safety system. The method also includes providing, to one or more data processing device(s) associated with the emergency personnel, access to communication through a computer network of the safety system during the emergency state in accordance with the automatic activation of the network access point.

In another aspect, a method of a safety system of a structure having a fixed piping system installed therewithin to supply breathable air from a source across the safety system is disclosed. The method includes automatically activating a network access point within the safety system associated with a component thereof upon detecting an emergency state within the safety system. The emergency state affects supply of the breathable air to emergency personnel within the safety system via the component. The method also includes providing, to one or more data processing device(s) associated with the emergency personnel, access to communication through a computer network of the safety system in a vicinity of the component and/or the network access point during the emergency state in accordance with the automatic activation of the network access point.

In yet another aspect, a safety system of a structure includes a fixed piping system installed within the structure to supply breathable air from a source across the safety system, and a network access point to automatically activate upon detection of an emergency state within the safety system. The emergency state affects supply of the breathable air to emergency personnel within the safety system. The safety system also includes one or more data processing device(s) associated with the emergency personnel to which access to communication through a computer network of the safety system is provided during the emergency state in accordance with the automatic activation of the network access point.

Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which:

FIG. 1B is a schematic view of the safety system of FIG. 1A integrated with and/or including other components, according to one or more embodiments.

FIG. 13 is a schematic view of a fire control room/fire command center of the safety system of FIG. 1B in an example implementation thereof.

FIG. 14 is a process flow diagram detailing the operations involved in network access point based improved communication between emergency personnel in a safety system of a structure having breathable air supplied thereacross, according to one or more embodiments.

Other features of the present embodiments will be apparent from the accompanying drawings and from the detailed description that follows.

DETAILED DESCRIPTION

Example embodiments, as described below, may be used to provide methods and/or a system of network access point based improved communication between emergency personnel in a safety system of a structure having breathable air supplied thereacross. Although the present embodiments have been described with reference to specific example embodiments, it will be evident that various modifications and changes may be made to these embodiments without departing from the broader spirit and scope of the various embodiments.

Figure 1A:
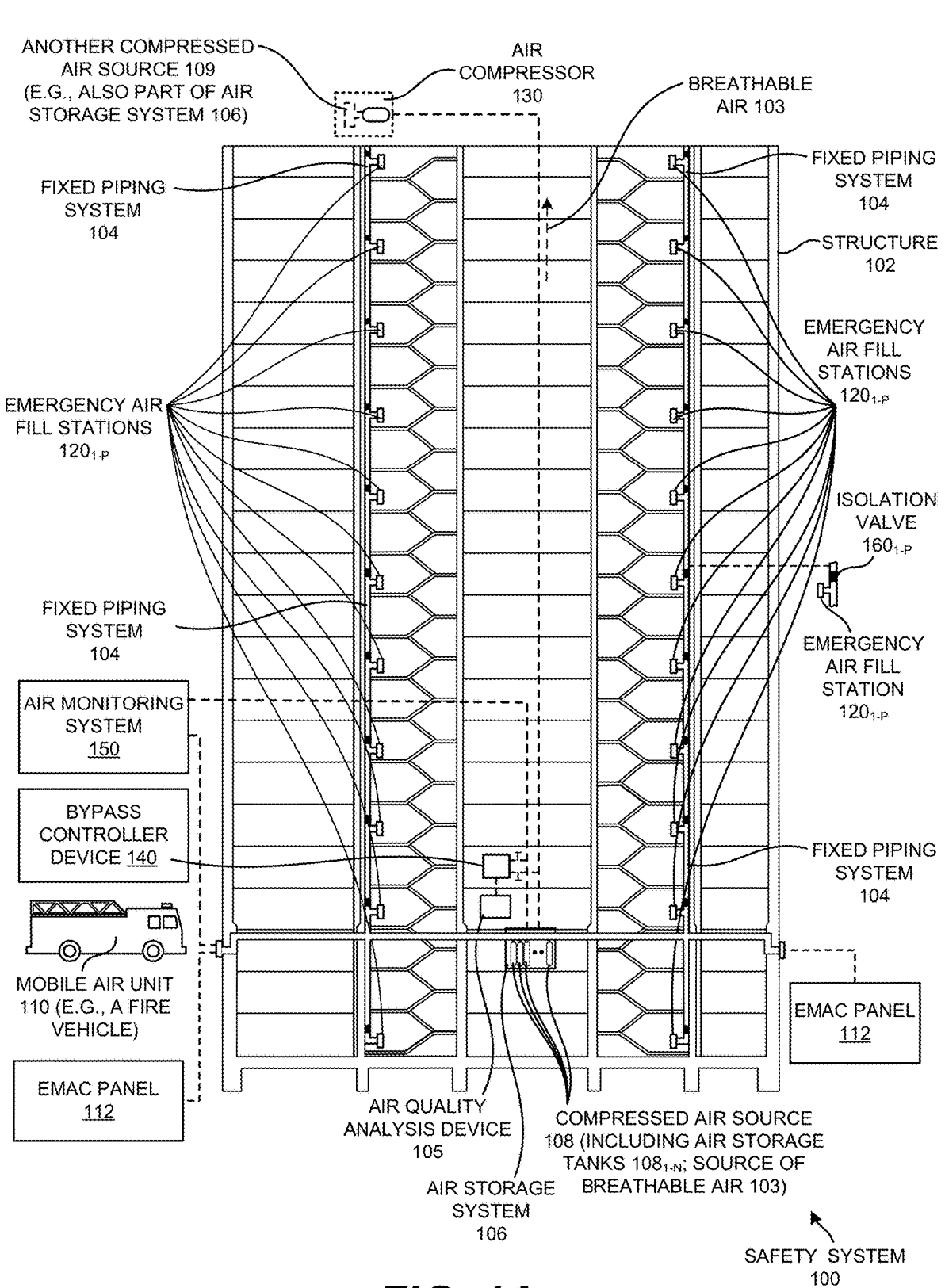
FIG. 1A is a schematic and an illustrative view of a safety system associated with a structure, according to one or more embodiments.

FIG. 1A shows a safety system 100 associated with a structure 102, according to one or more embodiments. In one or more embodiments, safety system 100 may be a Firefighter Air Replenishment System (FARS) to enable firefighters entering structure 102 in times of fire-related emergencies to gain access to breathable (e.g., human breathable) air (e.g., breathable air 103) in-house without the need of bringing in air bottles/cylinders to be transported up several flights of stairs of structure 102 or deep thereinto, or to refill depleted air bottles/cylinders that are brought into structure 102. In one or more embodiments, safety system 100 may supply breathable air provided from a supply of air tanks (to be discussed) stored in structure 102. When a fire department vehicle arrives at structure 102 during an emergency, breathable air supply typically may be provided through a source of air connected to said vehicle. In one or more embodiments, safety system 100 may enable firefighters to refill air bottles/cylinders thereof at emergency air fill stations (to be discussed) located throughout structure 102. Specifically, in some embodiments, firefighters may be able to fill air bottles/cylinders thereof at emergency air fill stations within structure 102 under full respiration in less than one to two minutes.

In one or more embodiments, structure 102 may encompass vertical building structures, horizontal building structures (e.g., shopping malls, hypermarts, extended shopping, storage and/or warehousing related structures), tunnels, marine craft (e.g., large marine vessels such as cruise ships, cargo ships, submarines and large naval craft, which may be "floating" versions of buildings and horizontal structures) and mines. Other structures are within the scope of the exemplary embodiments discussed herein. In one or more embodiments, safety system 100 may include a fixed piping system 104 permanently installed within structure 102 serving as a constant source of replenishment of breathable air 103. Fixed piping system 104 may be regarded as being analogous to a water piping system within structure 102 or another structure analogous thereto for the sake of imaginative convenience.

As shown in FIG. 1A, fixed piping system 104 may distribute breathable air 103 across floors/levels of structure 102. For the aforementioned purpose, fixed piping system 104 may distribute breathable air 103 from an air storage system 106 (e.g., within structure 102) including a number of air storage tanks 108$_{1-N}$ that serve as sources of pressurized/compressed air (e.g., breathable air 103). Additionally, in one or more embodiments, fixed piping system 104 may interconnect with a mobile air unit 110 (e.g., a fire vehicle) through an External Mobile Air Connection (EMAC) panel 112.

In one or more embodiments, EMAC panel 112 may be a boxed structure (e.g., exterior to structure 102) to enable the interconnection between mobile air unit 110 and safety system 100. For example, mobile air unit 110 may include an on-board air compressor to store and replenish pressurized/compressed air (e.g., breathable air analogous to breathable air 103) in air bottles/cylinders (e.g., utilizable with Self-Contained Breathing Apparatuses (SCBAs) carried by firefighters). Mobile air unit 110 may also include other pieces of air supply/distribution equipment (e.g., piping and/or air cylinders/bottles) that may be able to leverage the sources of breathable air 103 within safety system 100 through EMAC panel 112. Firefighters, for example, may be able to fill breathable air (e.g., breathable air 103, breathable air analogous to breathable air 103) into air bottles/cylinders (e.g., spare bottles, bottles requiring replenishment of breathable air) carried on mobile air unit 110 through safety system 100.

In FIG. 1A, EMAC panel 112 is shown at two locations merely for the sake of illustrative convenience. In one or more embodiments, an air monitoring system 150 may be installed as part of safety system 100 to automatically track and monitor a parameter (e.g., pressure) and/or a quality (e.g., indicated by moisture levels, carbon monoxide levels) of breathable air 103 within safety system 100. FIG. 1A shows air monitoring system 150 as communicatively coupled to air storage system 106 and EMAC panel 112 merely for the sake of example. The EMAC panel 112 may be at a remote location associated with (e.g., internal to, external to) structure 102. In one or more embodiments, for monitoring the parameters and/or the quality of breathable air within safety system 100, air monitoring system 150 include appropriate sensors and circuitries therein. For example, a pressure sensor (to be discussed) within air monitoring system 150 may automatically sense and record a pressure of breathable air 103 of safety system 100. Said pressure sensor may communicate with an alarm system that is triggered when the sensed pressure is outside a safety range. Also, in one or more embodiments, air monitoring system 150 may automatically trigger a shutdown of breathable air distribution through safety system 100 in case of impurity/contaminant (e.g., carbon monoxide) detection therethrough yielding levels above a safety/predetermined threshold.

In one or more embodiments, fixed piping system 104 may include pipes (e.g., constituted out of stainless steel tubing) that distribute breathable air 103 to a number of emergency air fill stations 120$_{1-P}$ within structure 102. In one example implementation, each emergency air fill station 120$_{1-P}$ may be located at a specific level of structure 102. If structure 102 is regarded as a vertical building structure, an emergency air fill station 120$_{1-P}$ may be located at each of a basement level, a first floor level, a second floor level and so on. For example, emergency air fill station 120$_{1-P}$ may be located at the end of the flight of stairs that emergency fighting personnel (e.g., firefighting personnel) need to climb to reach a specific floor level within the vertical building structure.

In one or more embodiments, an emergency air fill station 120$_{1-P}$ may be a static location within a level of structure 102 that provides emergency personnel 122 (e.g., firefighters, emergency responders) with the ability to rapidly fill air bottles/cylinders (e.g., SCBA cylinders). In one or more embodiments, emergency air fill station 120$_{1-P}$ may be an emergency air fill panel or a rupture containment air fill station. In one or more embodiments, proximate each emergency air fill station 120$_{1-P}$, safety system 100 may include an isolation valve 160$_{1-P}$ to isolate a corresponding emergency air fill station 120$_{1-P}$ from a rest of safety system 100. For example, said isolation may be achieved through the manual turning of isolation valve 160$_{1-P}$ proximate the corresponding emergency air fill station 120$_{1-P}$ or remotely (e.g., based on automatic turning) from air monitoring system 150. In one example implementation, air monitoring system 150 may maintain breathable air supply to a subset of emergency air fill stations 120$_{1-P}$ through control of a corresponding subset of isolation valves 160$_{1-P}$ and may isolate the other emergency air fill stations 120$_{1-P}$ from the breathable air supply. Thus, in one or more embodiments, isolation valves 160$_{1-P}$ may be employed to control the supply of breathable air 103 to the corresponding emergency air fill stations 120$_{1-P}$ (associated with levels of structure 102). Configurations and components of safety system 100 may vary from the example safety system 100 of FIG. 1A.

Figure 1B:
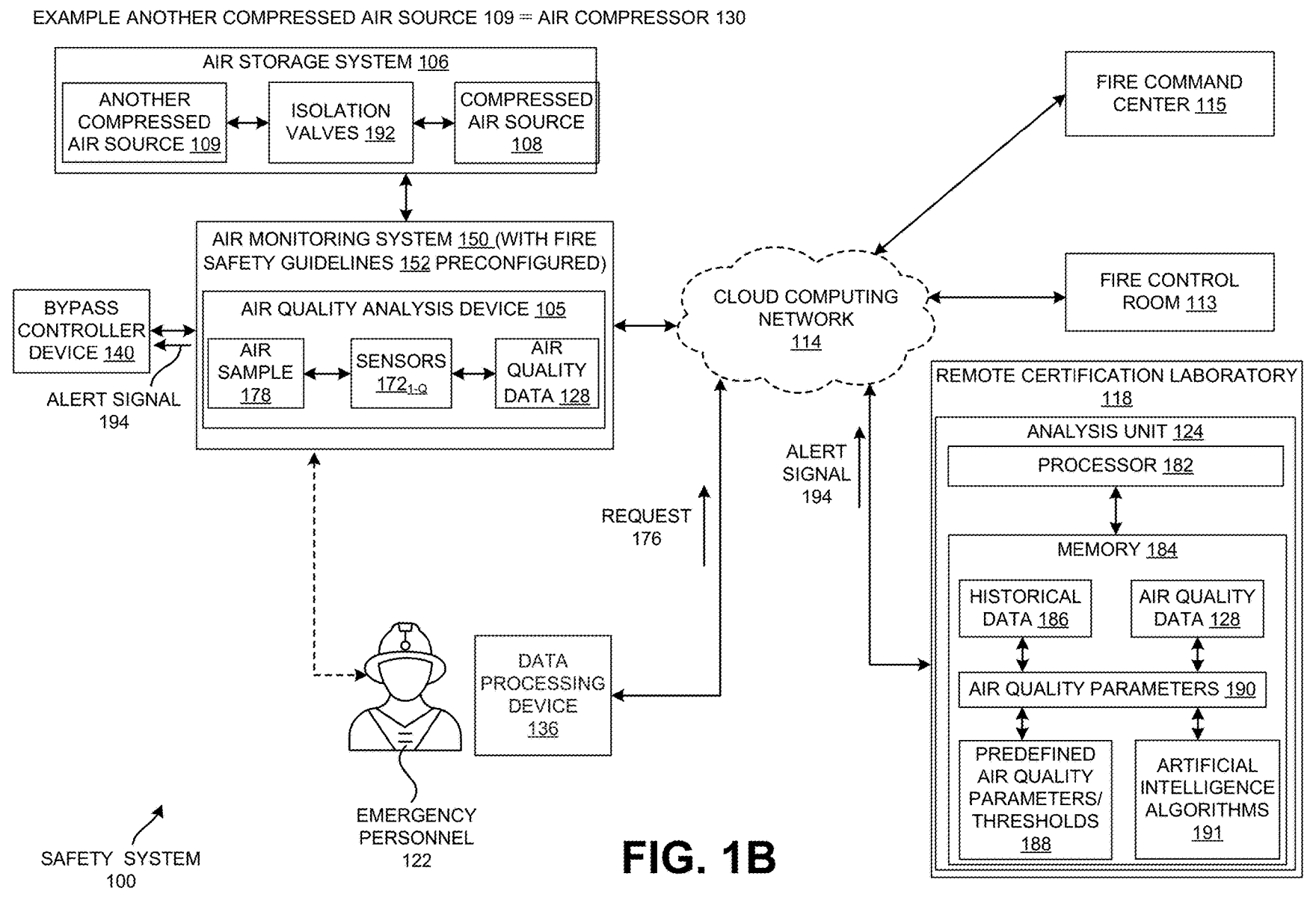

FIG. 1B shows safety system 100 of FIG. 1A integrated with and/or including other components, according to one or more embodiments. In one or more embodiments, safety system 100 shows air storage system 106 discussed above as including air storage tanks 108$_{1-N}$ (example pressurized/compressed air source shown as compressed air source 108) and air compressor 130. In some embodiments, air compressor 130 may be regarded as another compressed air source 109 internal to or external to structure 102, as will be discussed below. In one or more embodiments, air monitoring system 150 discussed above may include an air quality analysis device 105 (e.g., a programmable electromechanical device) to determine quality of breathable air 103 within safety system 100. In order to do this, in one or more embodiments, air quality analysis device 105 may be communicatively coupled to air storage system 106.

In one or more embodiments, air quality analysis device 105 may continuously and/or intermittently measure and analyze components of breathable air 103 within safety system 100. Further, in one or more embodiments, air quality analysis device 105 may compare the results of the analyses to standard fire safety guidelines 152 pertaining to the breathable air (e.g., breathable air 103) programmed therewithin, as shown in FIG. 1B. Alternatively or additionally, in some embodiments, standard fire safety guidelines 152 may exist on an external device (e.g., data processing device 136 to be discussed below/server) and accessed through air quality analysis device 105.

In one or more embodiments, air quality analysis device 105 may include a set of sensors 172$_{1-Q}$ to monitor parameters associated with quality of breathable air 103 and components thereof within safety system 100. In one or more embodiments, sensors 172$_{1-Q}$ may continuously (and automatically be programmed to) monitor the quality of breathable air 103 from air storage system 106 that is being supplied to the various emergency air fill stations 120$_{1-P}$ within structure 102. In one or more embodiments, once a deviation in an air parameter (e.g., temperature, pressure, contamination, carbon monoxide component, carbon dioxide component etc.) is detected by sensors 172$_{1-Q}$, air quality analysis device 105 may automatically activate a bypass controller device 140 (e.g., another programmable/controllable electromechanical device) to automatically switch off supply of breathable air 103 from compressed air source 108.

For example, bypass controller device 140 may control isolation valves 160$_{1-P}$ associated with emergency air fill stations 120$_{1-P}$ to automatically bypass compressed air source 108 (e.g., air storage tanks 108$_{1-N}$) with respect to breathable air 103 within safety system 100; appropriate control (e.g., closing) of isolation valves 160$_{1-P}$ may shut down breathable air 103 from compressed air source 108 to emergency air fill stations 120$_{1-P}$. Further, in response to the automatic bypass of compressed air source 108, bypass controller device 140 may automatically connect emergency air fill stations 120$_{1-P}$ to another compressed air source 109 of air storage system 106 as the source of breathable air 103 within safety system 100. Here, in one or more embodiments, isolation valves 160$_{1-P}$ may, again, be controlled to be, for example, opened to let another compressed air source 109 supply breathable air 103 within safety system 100. Thus, in one or more embodiments, the automatic switching between compressed air sources within safety system 100 may be accomplished through sensing/monitoring of parameters of breathable air 103 therewithin; such a switch may ensure a continuous, uninterrupted supply of breathable air 103 within safety system 100.

In one or more embodiments, the automatic switching between compressed air sources within safety system 100 may occur based on controlling isolation valves 192 associated with compressed air source 108 and another compressed air source 109 within air storage system 106. For example, automatic closing of an isolation valve 192 associated with compressed air source 108 within air storage system 106 and automatic opening of another isolation valve 192 associated with another compressed air source 109 based on detection of deviation in parameters of components of breathable air 103 may result in the automatic switching between compressed air sources within safety system 100. Another compressed air source 109 (e.g., air compressor 130) may be internal to structure 102 or external (e.g., mobile air unit 110 connected to safety system 100 through EMAC panel 112) thereto.

In one or more embodiments, emergency personnel 122 (e.g., firefighters, emergency responders, maintenance personnel, control room personnel) at data processing device 136 (e.g., a mobile phone, a tablet, a server, a laptop, a computing device) may request one or more air quality tests on breathable air 103 through air quality analysis device 105. In one or more embodiments, said request 176 may activate (e.g., automatically) air quality analysis device 105 to obtain an air sample 178 of breathable air 103. For example, air quality analysis device 105 may allow a predetermined quantity/volume of breathable air 103 pass through a chamber (not shown) thereof to enable air sample 178 to be procured for said one or more quality tests. Alternatively or additionally, air quality analysis device 105 may allow breathable air 103 to pass through the chamber for a predetermined duration to enable air sample 178 to be procured for the one or more quality tests.

Figure 2:
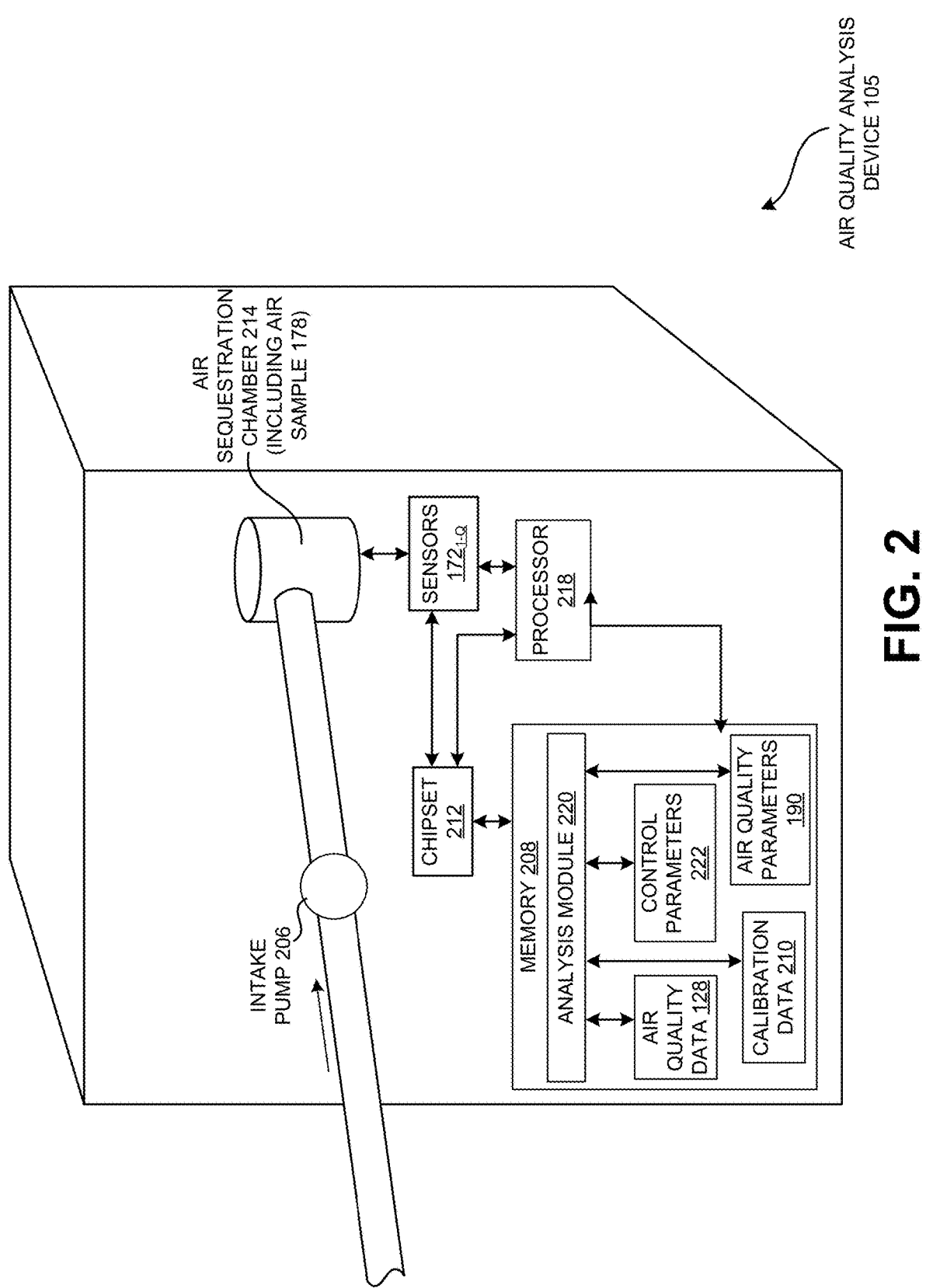
FIG. 2 is a schematic view of an air quality analysis device of the safety system of FIGS. 1A-B, according to one or more embodiments.

FIG. 2 shows air quality analysis device 105, according to one or more embodiments. In some embodiments, air quality analysis device 105 may be integrated with fixed piping system 104 to be along the path of flow of breathable air 103. In other embodiments, air quality analysis device 105 may be part of air monitoring system 150 or even air storage system 106. In some other embodiments, air quality analysis device 105 may merely be along a flow path of breathable air 103 of safety system 100. In one or more embodiments, air quality analysis device 105 may include an intake pump 206 to ingest a quantity/volume of breathable air 103 through fixed piping system 104 into an air sequestration chamber 214, thereby segregating air sample 178 of breathable air 103 for analysis. In one or more embodiments, air sequestration chamber 214 may be communicatively coupled to sensors 172$_{1-Q}$ that analyze air sample 178 therewithin and perform operations and functionalities related to monitoring and/or sensing parameters related to air quality and components of breathable air 103 within safety system 100.

In one or more embodiments, a chipset 212 coupled to a memory 208 (e.g., a volatile and/or a non-volatile memory) may, in turn, be electrically coupled to sensors 172$_{1-Q}$ to convert results of the sensing and/or monitoring into machine (e.g., a data processing device such as data processing device 136) readable/interpretatable air quality data 128 (e.g., stored in memory 208); said air quality data 128 may be communicable to a remote certification laboratory 118 (referring back to FIG. 1B) through a computing network (e.g., cloud computing network 114). Thus, in one or more embodiments, analysis and/or certification of breathable air 103 through safety system 100 by professionals may be enabled through safety system 100. As shown in FIG. 2, memory 208 and chipset 212 may be communicatively coupled to a processor 218 (e.g., a microcontroller) that executes instructions associated with the abovementioned operations and/or functionalities. For this purpose, in one or more embodiments, memory 208 may include instructions associated with an analysis module 220 stored therein that are executable through processor 218.

In one or more embodiments, remote certification laboratory 118 may analyze air quality data 128 of air sample 178 and automatically generate an alert signal 194 to activate bypass controller device 140 if anomalies (e.g., due to air contamination, particulates, pollutants, etc.) and/or faults (e.g., deviation from predefined parameters such as temperature, pressure, a proportion of air components, etc.) are detected in air quality data 128. In one or more embodiments, for the aforementioned purpose, bypass controller device 140 may automatically generate signals to control isolation valves 160$_{1-P}$/isolation valves 192, as discussed above. In addition, in one or more embodiments, air quality data 128 may be communicated to a fire command center 115 (e.g., a remote center with data processing capabilities), a fire control room 113 (e.g., a control room internal to or external to structure 102) and/or emergency personnel 122 at data processing device 136 through cloud computing network 114.

In one or more embodiments, remote certification laboratory 118 alone may not generate alert signal 194. In one or more embodiments, based on monitoring and/or sensing of breathable air 103 and components thereof through air quality analysis device 105 as discussed above, alert signal 194 may be directly generated through air quality analysis device 105, for example, based on an alert system (not shown) implemented therein. As discussed above, in accordance therewith, bypass controller device 140 coupled to air monitoring system 150 may generate signals to automatically bypass air storage system 106 (e.g., compressed air source 108) with respect to supply of breathable air 103 within safety system 100 and/or automatically switch between compressed air sources (e.g., between compressed air source 108 and another compressed air source 109 and/or vice versa).

In one or more embodiments, air quality analysis device 105 may be permanently affixed (or, along a path of breathable air 103 within fixed piping system 104) to fixed piping system 104 to avoid logistical issues related to building an analogous sensing/monitoring mechanism offsite, and/or to reduce the risk of breathing contaminated air causing harm to emergency personnel 122 during an emergency (e.g., air contamination, air pollution, fire, smoke).

In one or more embodiments, as shown in FIG. 2, memory 208 of air quality analysis device 105 may include known calibration data 210 stored therein that is used by processor 218 (e.g., by analysis module 220) to compare a characteristic/parameter of breathable air 103 therewith based on results of analysis through remote certification laboratory 118 and/or air quality analysis device 105. In one or more embodiments, in response to determining through processor 218 that the characteristic/parameter is dissimilar to one or more of known calibration data 210, control parameters 222 (e.g., stored in memory 208) of air quality analysis device 105 may be adjusted to account for said dissimilarities. Also, in one or more embodiments, air quality analysis device 105 may include appropriate circuitry to receive instructions from fire command center 115, fire control room 113 and/or data processing device 136 (emergency personnel 122) to mark/alert safety system 100 for transitioning thereof into an emergency state and/or generate trigger signals to activate bypass controller device 140 for automatic bypass of air storage system 106/compressed air source 108/another compressed air source 109 discussed above. Again, in one or more embodiments, the same functionalities may be provided to air quality analysis device 105 itself.

In one or more embodiments, as shown in FIG. 1B, remote certification laboratory 118 may include an analysis unit 124 (e.g., a data processing device such as a server) including a processor 182 (e.g., a processor core, a network of processors, a processor) communicatively coupled to a memory 184 (e.g., a volatile and/or a non-volatile memory and/or a database). In one or more embodiments, memory 184 may have historical data 186 (e.g., relevant to safety system 100 and breathable air 103 therein) and predefined air quality parameters/thresholds 188 (e.g., as per National Fire Protection Association (NFPA) standards, as per general and/or custom safety standards) for breathable air 103. In one or more embodiments, analysis unit 124 may measure air quality parameters 190 (also shown as part of memory 208 of air quality analysis device 105 to account for air quality analysis device 105 performing operations analogous to analysis unit 124 including triggering bypass controller device 140 to automatic bypass air storage system 106/compressed air source 108/another compressed air source 109 discussed above) using air quality data 128. In some embodiments, analysis unit 124 may execute one or more artificial intelligence algorithms 191 (e.g., stored in memory 184 and executable through processor 182) for advanced profiling and/or testing of breathable air 103 through safety system 100.

In some embodiments, the profiling and/or testing through analysis unit 124 of remote certification laboratory 118 may provide for accreditation of air quality of breathable air 103 within safety system 100 when the results of the profiling/testing yield that air quality parameters 190 are within the predefined air quality parameters/thresholds 188; the aforementioned accreditation may be provided in the form of a certificate to fire command center 115, fire control room 113 and/or data processing device 136 (emergency personnel 122). In some embodiments, each time safety system 100 is certified, the corresponding certification generated may be written permanently into a distributed ledger and/or a blockchain (e.g., Ethereum™ blockchain, Solana™ blockchain; part of memory 184 or a cloud version thereof) for redundant and secondary record-keeping. In addition, advanced reporting, analytics, control and/or test functions may be enabled through a mobile and/or a desktop application (e.g., executing on data processing device 136).

In one or more embodiments, when the results of the profiling/testing yield that air quality parameters 190 are not within predefined air quality parameters/thresholds 188, remote certification laboratory 118/analysis unit 124 may generate alert signal 194 to notify fire command center 115, fire control room 113 and/or data processing device 136 (emergency personnel 122) of an emergency state of safety system 100. In some implementations, alert signal 194 may automatically activate bypass controller device 140 to switch off supply of breathable air 103 from compressed air source 108/another compressed air source 109/air storage system 106 and, thereby, isolate compressed air source 108/another compressed air source 109/air storage system 106 from safety system 100. Alert signal 194 additionally may activate bypass controller device 140 to automatically connect a different compressed air source (e.g., another compressed air source 109) to safety system 100/emergency air fill stations 120$_{1-P}$ to ensure a continuous supply of breathable air 103 within safety system 100, according to one or more embodiments.

Figure 3:
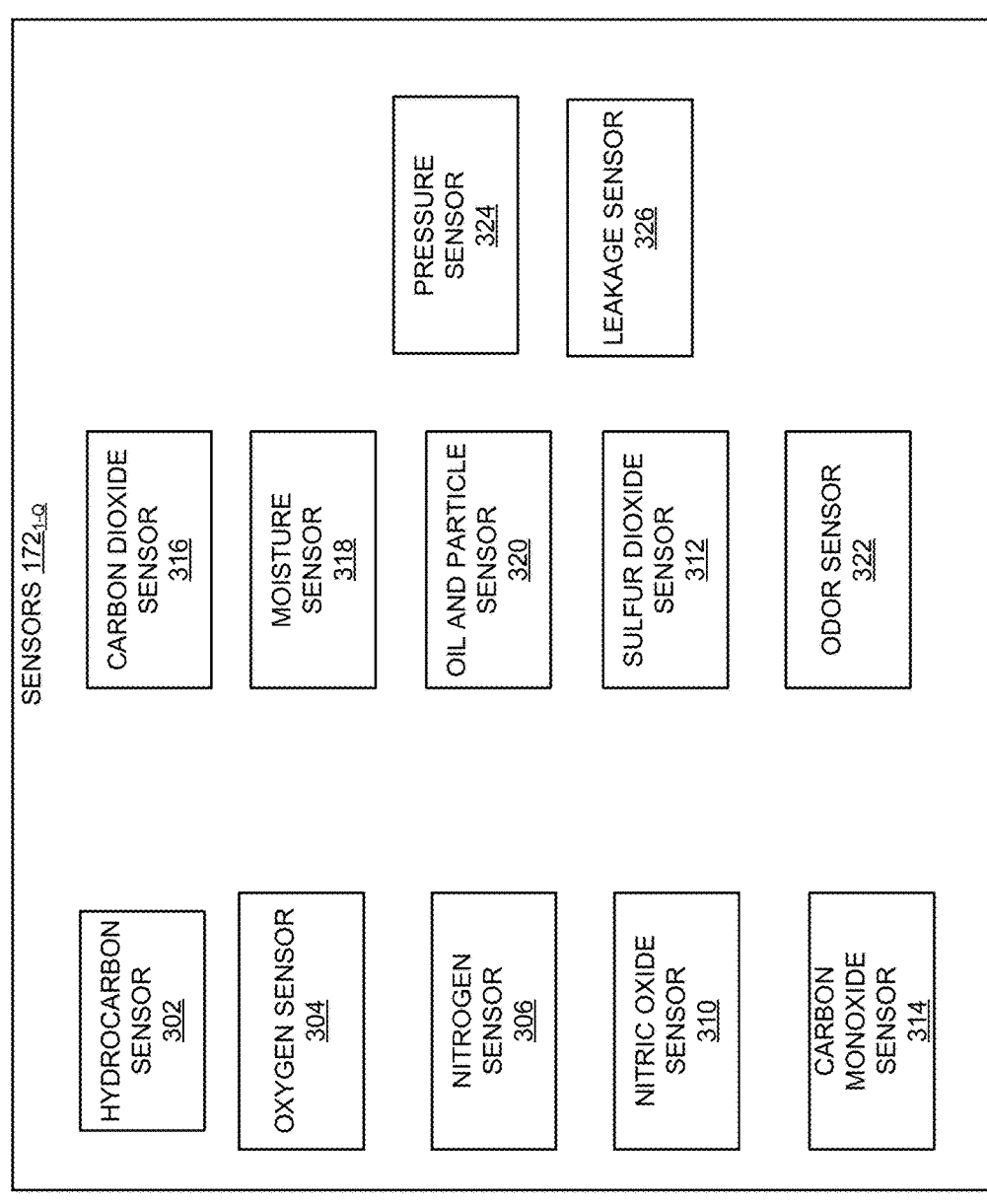
FIG. 3 is a schematic view of example constituent sensors within the air quality analysis device of FIGS. 1A-B and FIG. 2.

FIG. 3 shows constituent sensors of sensors 172$_{1-Q}$, according to one or more embodiments. In one or more embodiments, sensors 172$_{1-Q}$ may include a hydrocarbon sensor 302 to measure a hydrocarbon level to an accuracy of, say, 0.02-0.3% absolute, an oxygen sensor 304 to measure an oxygen level to an accuracy of, say, 0.1% absolute, a nitrogen sensor 306, a nitric oxide sensor 310, a carbon monoxide sensor 314, a carbon dioxide sensor 316, a moisture sensor 318, an oil and particle sensor 320 to measure a level of oil and/or particle to an accuracy of, say, +2% relative, a sulfur dioxide sensor 312, a pressure sensor 324, an odor sensor 322 and/or a leakage sensor 326. In one or more embodiments, the automatic bypassing of air storage system 106/compressed air source 106/another compressed air source 109 through bypass controller device 140 may be initiated when one or more of the following conditions are detected through the corresponding sensors 172$_{1-Q}$:

1. carbon monoxide sensor 314 detects a level of carbon monoxide in breathable air 103 in excess of a first predetermined threshold value (e.g., 4.5 parts per million; part of predefined air quality parameters/thresholds 188 shown as stored in both memory 184 and memory 208), 2. carbon dioxide sensor 316 detects a level of carbon dioxide in breathable air 103 in excess of a second predetermined threshold value (e.g., 1,000 parts per million; part of predefined air quality parameters/thresholds 188), 3. oxygen sensor 304 detects a level of oxygen in breathable air 103 outside a predetermined range of values (e.g., between 19.5% and 23.5; part of predefined air quality parameters/thresholds 188), 4. nitrogen sensor 306 detects a level of nitrogen in breathable air 103 less than a third predetermined threshold value (e.g., below 75%; part of predefined air quality parameters/thresholds 188) and/or in excess of a fourth predetermined threshold value (e.g., above 81%; part of predefined air quality parameters/thresholds 188), 5. hydrocarbon sensor 302 detects a condensed hydrocarbon content in breathable air 103 in excess of a fifth predetermined threshold value (e.g., 5 milligrams per cubic meter of breathable air 103; part of predefined air quality parameters/thresholds 188), 6. moisture sensor 318 detects a moisture concentration in breathable air 103 in excess of a sixth predetermined threshold value (e.g., 24 parts per million by volume; part of predefined air quality parameters/thresholds 188), and 7. pressure sensor 324 detects a pressure of breathable air 103 less than a seventh predetermined threshold value (e.g., below 90% of a maintenance pressure specified in a fire code; part of predefined air quality parameters/thresholds 188).

Other types of sensors that are part of sensors 172$_{1-Q}$ have analogous predetermined threshold values/ranges (e.g., part of predefined air quality parameters/thresholds 188) associated with air quality parameters 190 sensed therethrough; such sensors 172$_{1-Q}$ are shown in FIG. 3 and are self-explanatory. Parameters sensed through sensors 172$_{1-Q}$ may not be limited to air quality parameters 190; even characteristics such as pressure (e.g., through pressure sensor 324) may be sensed through sensors 172$_{1-Q}$. Also, in one or more embodiments, leakage of breathable air 103 from safety system 100 (e.g., fixed piping system 104, at emergency air fill stations 120$_{1-P}$, isolation valves 160$_{1-P}$, air storage system 106 such as compressed air source 108/air storage tanks 108$_{1-N}$/another compressed air source 109) may also be sensed through appropriate sensors 172$_{1-Q}$ (e.g., leakage sensor 326). In one example implementation, leakage sensor 326 may be an ultrasound sensor that senses high sound frequencies of leaks of breathable air 103. Said leaks, if not addressed appropriately, may result in catastrophic loss of breathable air 103 from safety system 100. In one or more embodiments, once sensors 172$_{1-Q}$ detect the leakage of breathable air 103, again, bypass controller device 140 may automatically be triggered to bypass air storage system 106/compressed air source 108/another compressed air source 109, as discussed above.

Thus, in one or more embodiments, the capabilities of air quality analysis device 105 and/or remote certification laboratory 118 may be extended to accommodate detection of parameters such as pressure and leakage of breathable air 103. All reasonable variations are within the scope of the exemplary embodiments discussed herein.

Figure 4:
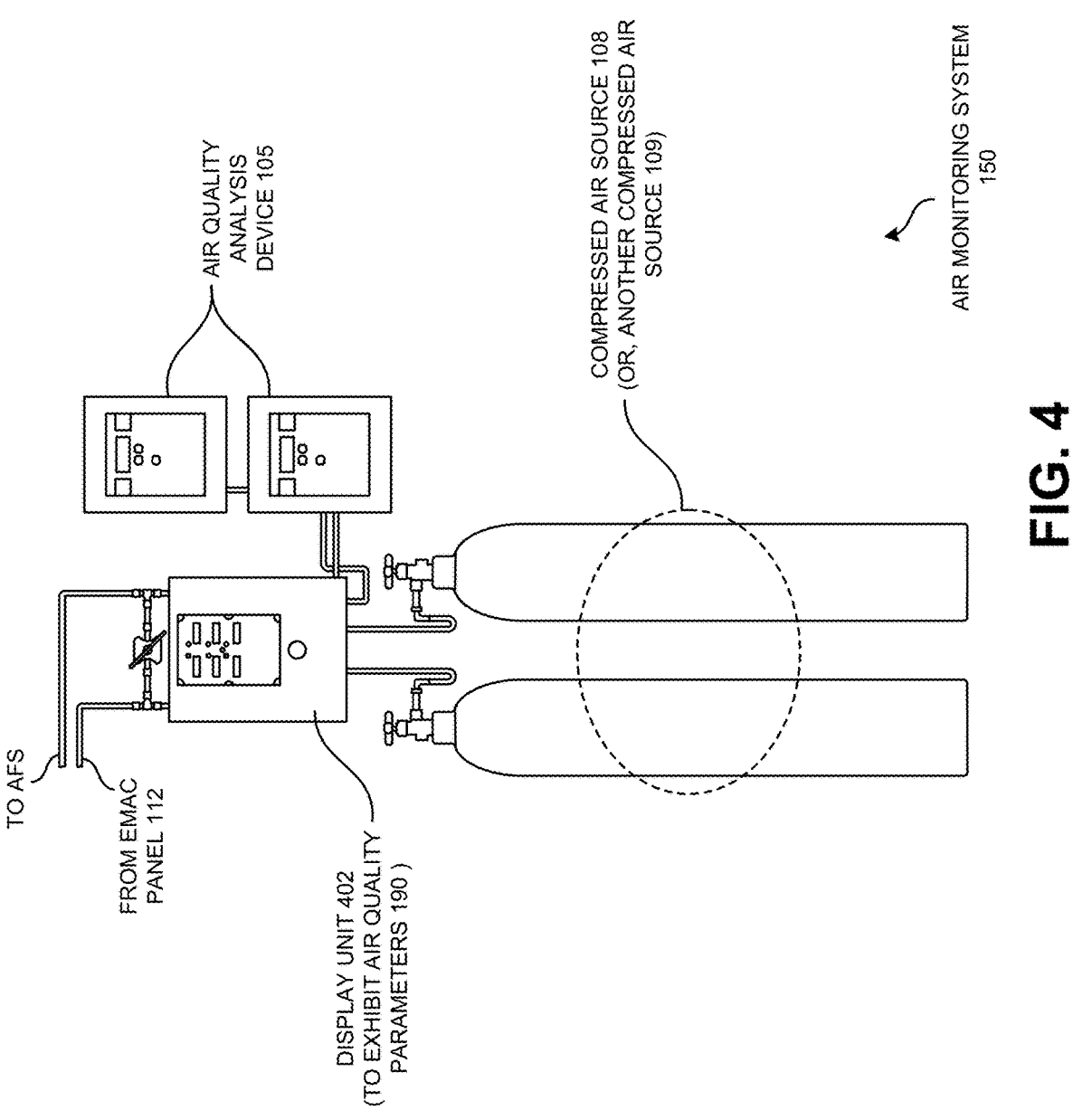
FIG. 4 is a schematic and an illustrative view of an example air monitoring system of the safety system of FIGS. 1A-B.

FIG. 4 shows air monitoring system 150 discussed above in an example implementation form. Here, air monitoring system 150 may be a collection of units and/or components put together to check and record quality (and/or pressure/leakage) of breathable air 103 and components thereof within safety system 100. Air quality analysis device 105 may include a display unit 402 associated therewith (e.g., part of or external to air quality analysis device 105). to exhibit air quality parameters 190 captured and/or analyzed through air quality analysis device 105. Display unit 402 may be part of an Android™-based data processing device (e.g., a tablet, a notebook) with a touchscreen for visual presentation of air quality parameters 190.

Display unit 402, as discussed herein, may be an electromechanical device installed at key locations of structure 102, and air quality analysis device 105 may be made of one or more material(s) having fire-rated capabilities. A video camera (not shown) installed on or integrated with display unit 402 may capture visual incidents at the key locations that are accessible at fire command center 115, fire control room 113 and/or data processing device 136 through cloud computing network 114. Air quality parameters 190 may be monitored in accordance with standard fire safety guidelines (e.g., NFPA guidelines, Occupational Safety and Health Administration (OSHA) and/or Compressed Gas Association (CGA) standards).

Figure 5:
FIG. 5 is a schematic and an illustrative view of an example display unit associated with the air quality analysis device of the air monitoring system of FIG. 4.

FIG. 5 shows an example display unit 402 associated with air quality analysis device 105 of FIG. 4. Display unit 402 may include various indicator fields to exhibit air quality parameters 190 captured and/or analyzed by air quality analysis device 105 in real-time. For example, indicator field 502 may be associated with carbon monoxide content in breathable air 103 (e.g., from air storage system 106/compressed air source 108), indicator field 504 may be associated with carbon dioxide content in breathable air 103, indicator field 510 may be associated with nitrogen content in breathable air 103, indicator field 506 may be associated with moisture content in breathable air 103, indicator field 508 may be associated with oxygen content in breathable air 103, and indicator field 512 may be associated with hydrocarbon content in breathable air 103. In addition, display unit 402 may include a pressure indicator 514 to exhibit air pressure of breathable air 103 (e.g., air sample 178).

Further, display unit 402 may include indicator lights (not shown) to indicate changes in air quality parameters 190 through changes in colors of lights emitted therefrom. Still further, display unit 402 may include, for example, a Quick Response (QR) scanner (not shown) to enable emergency personnel 122 to scan and check statuses of air quality parameters 190.

Figure 6:
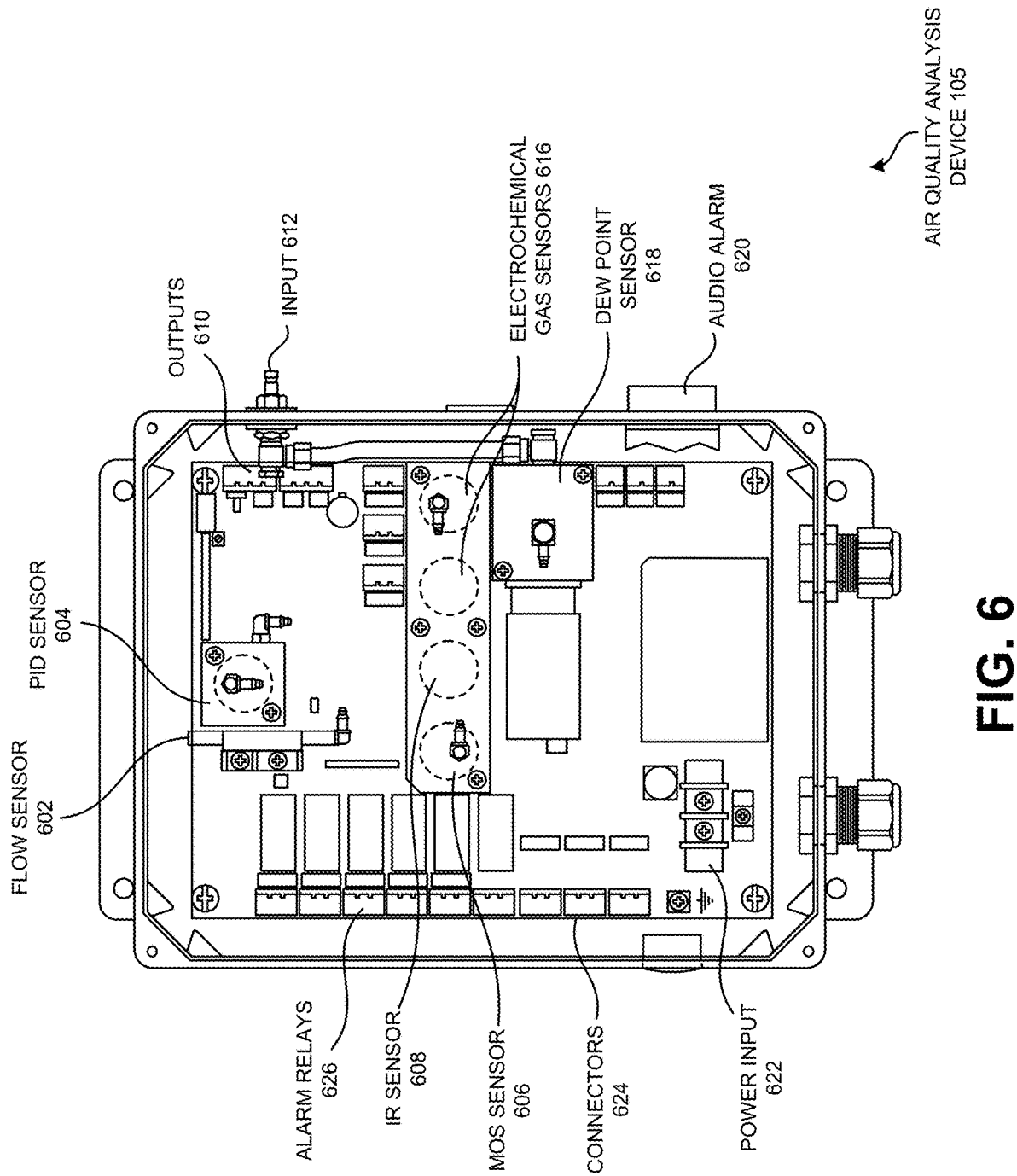
FIG. 6 is a schematic and an illustrative view of an example air quality analysis device of the safety system of FIGS. 1A-B.

FIG. 6 shows an example air quality analysis device 105. Air quality analysis device 105 may include a flow sensor 602 (e.g., an electronic device) that measures and/or regulates a flow rate of breathable air 103 (e.g., from compressed air source 108, another compressed air source 109) within fixed piping system 104. A photoionization detector (PID) sensor 604 of air quality analysis device 105 may detect low concentrations of volatile organic compounds (VOCs)/hazardous substances in breathable air 103. In one example implementation, PID sensor 604 may utilize ultraviolet (UV) light to break down said VOCs in breathable air 103 into positive and negative ions, following which a charge of the ionized gas as a function of concentration of the VOCs in breathable air 103 is detected and/or measured.

A Metal Oxide Semiconductor (MOS) sensor 606 of air quality analysis device 105 may detect concentrations of various types of gases in breathable air 103/air sample 178 by measuring a change in resistance of a metal oxide due to adsorption of gases in breathable air 103/air sample 178. An infrared (IR) sensor 608 of air quality analysis device 105 may measure and/or detect infrared radiation in a surrounding environment of air quality analysis device 105. All sensors discussed herein may be part of sensors $172_{1-Q}$ discussed above.

Outputs 610 may be in the form of electrical signals used to identify air components of breathable air 103/air sample 178. The electrical signals may be generated by sensors $172_{1-Q}$ including the sensors discussed herein. An input 612 may be an intake of breathable air 103/air sample 178 (e.g., through a hose) from compressed air source 108/another compressed air source 109/air storage system 106.

An electromechanical gas sensor 616 of air quality analysis device 105 may be operated based on a diffusion of a gas of interest (e.g., air components of breathable air 103/air sample 178) thereinto. Said diffusion may result in generation of an electrical signal proportional to a concentration of the gas of interest. A dew point sensor 618 of air quality analysis device 105 may be used to measure and/or monitor a dew point temperature of breathable air 103/air sample 178. An audio alarm 620 may be a transducer device to emit an audible alert once an emergency state is detected by sensors $172_{1-Q}$. A power input 622 may be an input corresponding to an amount of energy put into and/or consumed by air quality analysis device 105. Connectors 624 may be links between electrical components of air quality analysis device 105.

An alarm relay 626 may be an electric switch that activates bypass controller device 140 when anomalies (e.g., contamination in breathable air 103) and/or faults (e.g., fire hazards, pressure variations, deviation in predefined air/air quality parameters, etc.) are detected by sensors $172_{1-Q}$, following which bypass controller device 140 may enable automatic bypassing of air storage system 106/compressed air source 108/another compressed air source 109 as discussed above. In one or more embodiments, air monitoring system 150 may be made of fire-rated material to protect safety system 100 from physical damage during hazardous situations. Further, in one or more embodiments, air monitoring system 150 may be made of weather-resistant and/or UV/solar/infrared radiation-resistant material/material(s) to prevent corrosion and/or deterioration of components thereof due to prolonged exposure to harsh environmental and/or weather conditions.

Figure 7:
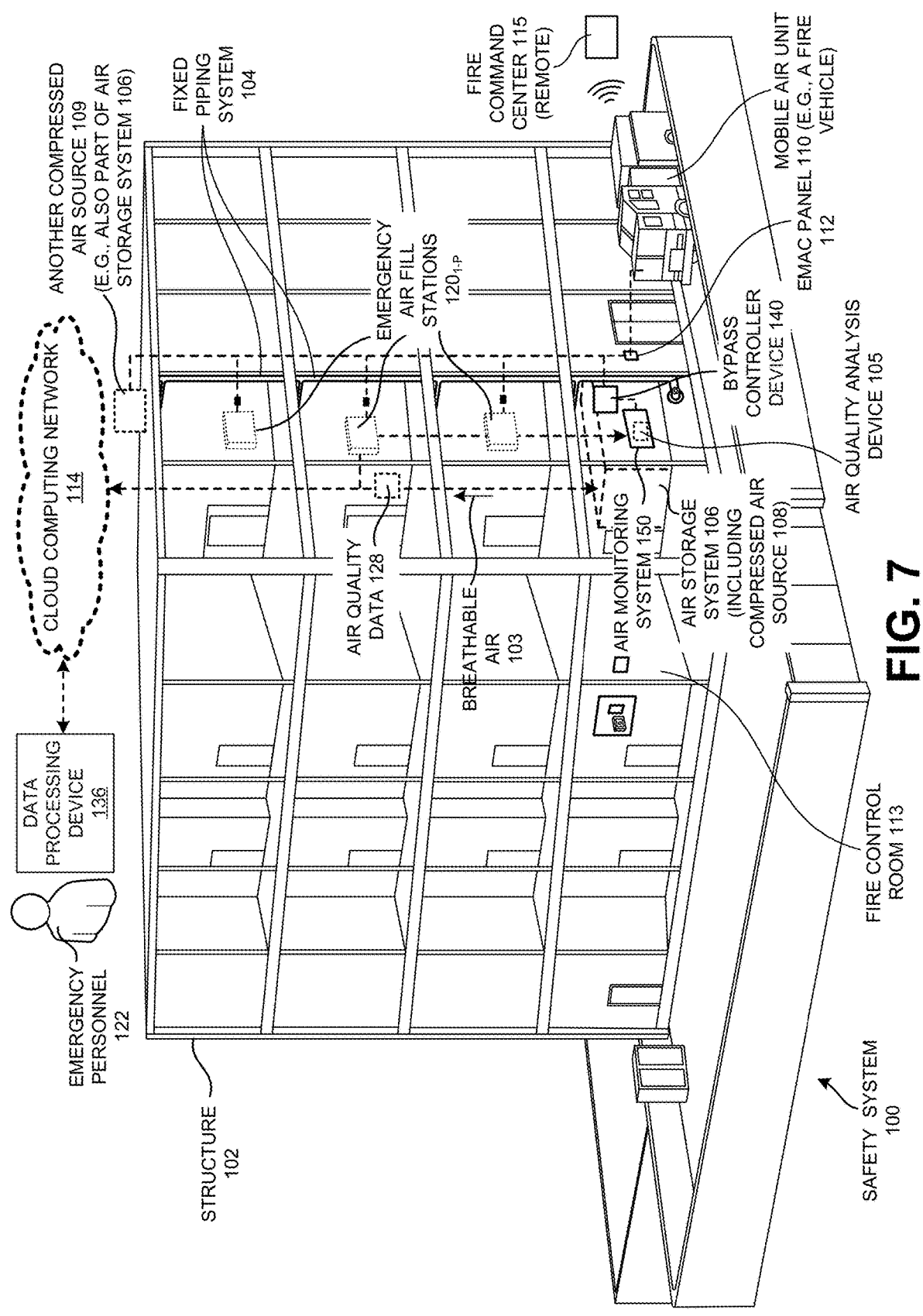
FIG. 7 is a schematic and an illustrative view of the safety system of FIGS. 1A-B implemented in a horizontal configuration of the structure thereof and communication therewithin, according to one or more embodiments.
Figure 8:
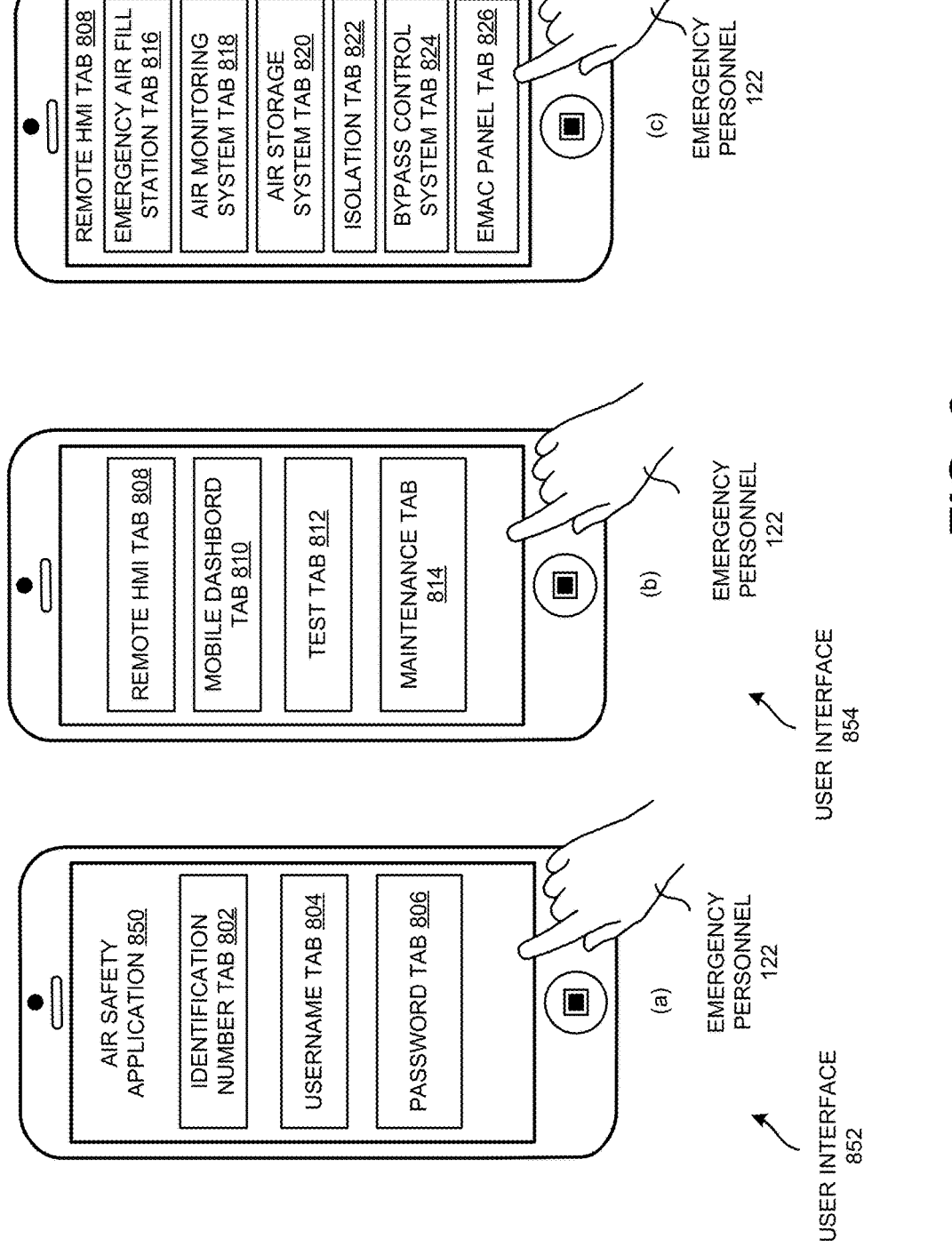
FIG. 8 is an example user interface view of an air safety application executing on a data processing device of FIG. 1B and FIG. 7.

FIG. 7 shows safety system 100 implemented in a horizontal configuration of structure 102 and communication therewithin, according to one or more embodiments. All concepts discussed in this Application may also be applicable to FIG. 7. FIG. 8 shows an example user interface 852 of an air safety application 850 executing on data processing device 136 (e.g., on a processor communicatively coupled to a memory thereof). As shown in '(a)', user interface 852 may display user authentication tabs of air safety application 850. Example user authentication tabs may include an identification number tab 802, a username tab 804, and a password tab 806. Emergency personnel 122 (e.g., authorized users, firefighters, emergency responses) may need to enter a corresponding identification number, username and password to access features provided through air safety application 850.

As shown in '(b)', upon authentication, example user interface 854 may display a remote Human-Machine Interface (HMI) tab 808, a mobile dashboard tab 810, a test tab 812, and a maintenance tab 814. Remote HMI tab 808 may help emergency personnel 122 to remotely control safety system 100. Mobile dashboard tab 810 may help show a real-time graphical display of an entirety of safety system 100. Test tab 812 may help emergency personnel 122 to request analysis of breathable air 103 through remote certification laboratory 118 and generate custom reports. Maintenance tab 814 may help provide a proactive dimension to view upcoming and/or current maintenance requirements of safety system 100.

As shown in '(c)', remote HMI tab 808 may display an emergency air fill station tab 816, an air monitoring system tab 818, an air storage system tab 820, an isolation tab 822, a bypass control system tab 824, and an EMAC panel tab 826. Remote HMI tab 808 may enable emergency personnel 122 to control components associated with the aforementioned tabs to effect automatic bypass of air storage system 106/compressed air source 108/another compressed air source 109, as discussed above, and obtain air quality parameters 190. Based on zeroing in on specific tabs discussed herein, more detailed operations such as controlling relay devices, requesting certification through remote certification laboratory 118, purging breathable air 103 from safety system 100, isolating compressed air source 108/another compressed air source 109/air storage system 106 and so on are within the scope of the exemplary embodiments discussed herein.

In one or more embodiments, based on detection of emergency state(s) of safety system 100 and/or anomalous air quality parameters 190 through sensors $172_{1-Q}$ via data processing device 136, fire command center 115 and/or fire control room 113, emergency personnel 122 may be able to purge safety system 100 of contaminated/bad/anomalous breathable air 103 prior to switching from one compressed air source (e.g., compressed air source 108) to another compressed air source (e.g., another compressed air source 109). In some other embodiments, leakage (e.g., detected through leakage sensor 326) of breathable air 103 may require plugging in of leak(s) in components of safety system 100 and/or fixing said components prior to reuse of the same compressed air source (e.g., air storage system 106, compressed air source 108, another compressed air source 109). The aforementioned tasks are instantaneously notified to emergency personnel 122 in accordance with one or more implementations of safety system 100 discussed herein. All reasonable variations are within the scope of the exemplary embodiments discussed herein.

Figure 9:
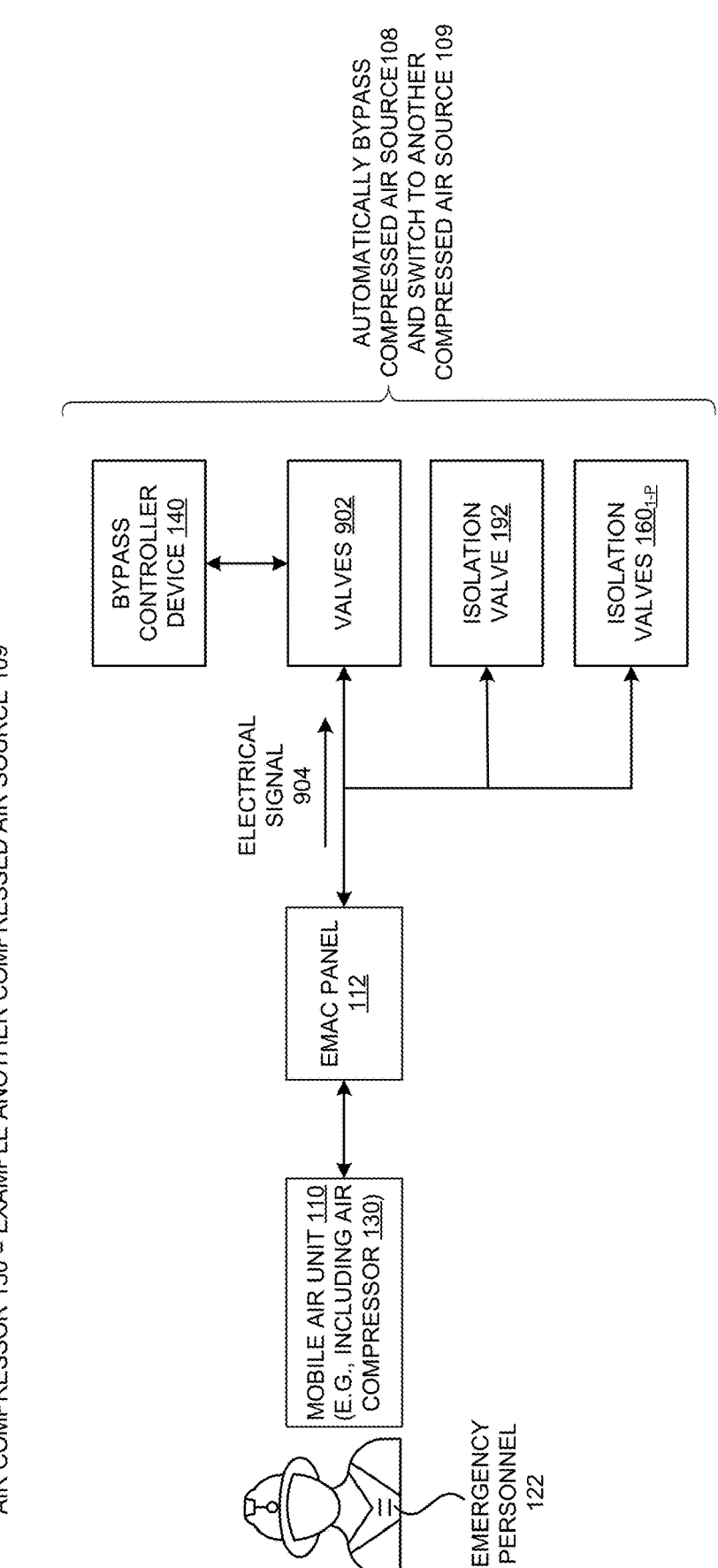
FIG. 9 is a schematic view of control of valves remotely from an External Mobile Air Connection (EMAC) panel of the safety system of FIG. 1B and FIG. 7, according to one or more embodiments.

In the case of another compressed air source 109 being mobile air unit 110 with air compressor 130, bypass controller device 140 may be implemented with one or more check valves and/or one or more automatic actuator selector valves remotely operable from EMAC panel 112 readily accessible by emergency personnel 122. FIG. 9 shows control of valves 902 (e.g., check valves, automatic actuator selector valves) implemented in conjunction with bypass controller device 140/isolation valve 192/isolation valves $160_{1-P}$ remotely from EMAC panel 112 by emergency personnel 122, according to one or more embodiments. In one or more embodiments, in response to an electrical signal 904 from EMAC panel 112 (e.g., following detection of anomalies/faults in air quality parameters 190), valves 902/isolation valve 192/isolation valves $160_{1-P}$ may be controlled to enable automatic bypass/isolation of compressed air source 108 with respect to breathable air 103 within safety system 100 and automatic switching to another compressed air source 109 (e.g., air compressor 130 on mobile air unit 110) to ensure direct and continued supply of breathable air 103 from another compressed air source 109 within safety system 100. In the case of control of isolation valve 192/isolation valves $160_{1-P}$ through electrical signal 904, isolation valve 192 and/or isolation valves $160_{1-P}$ may also be implemented with check valves and/or automatic actuator selector valves. All reasonable variations are within the scope of the exemplary embodiments discussed herein.

Figure 10:
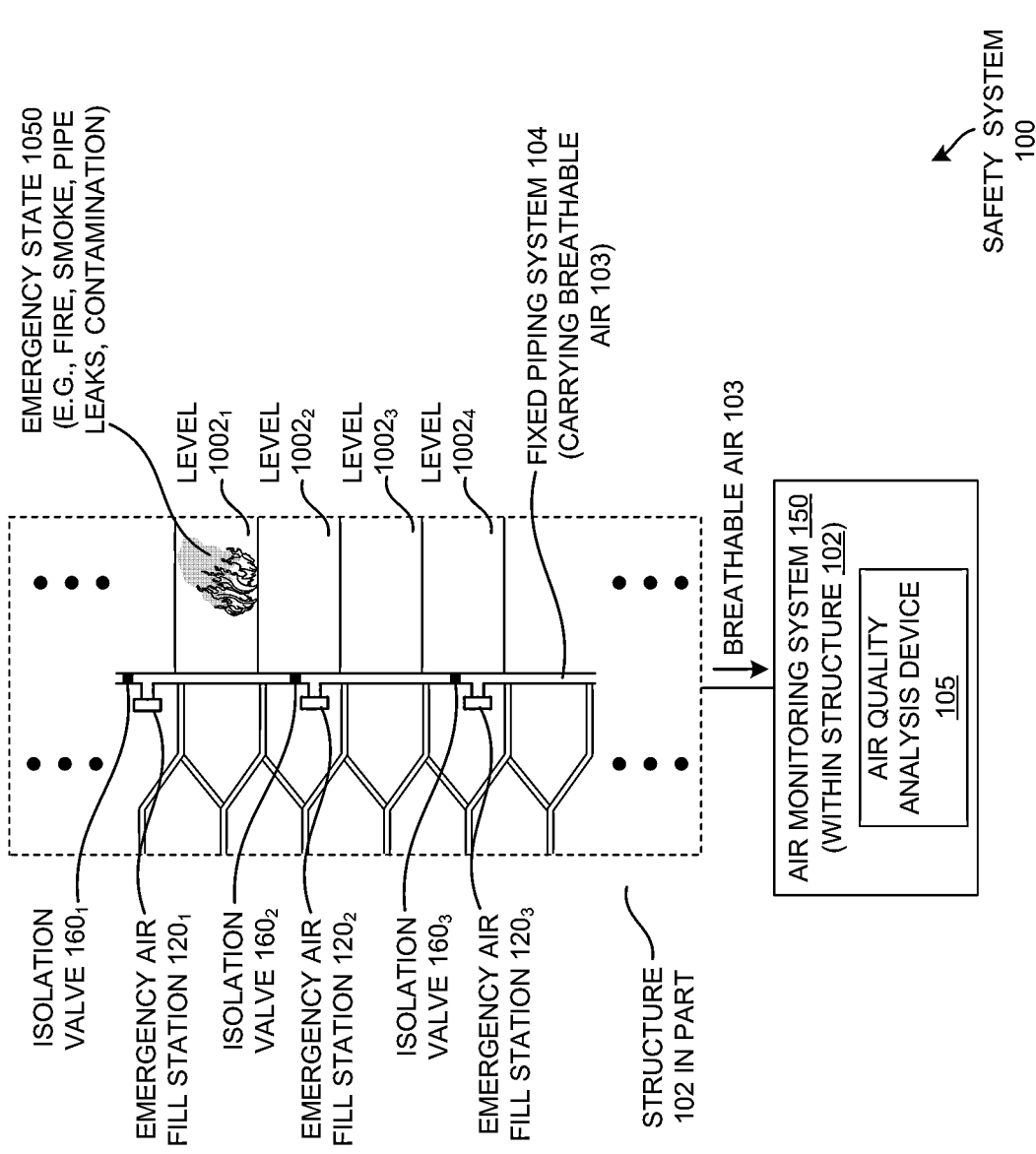
FIG. 10 is a schematic and an illustrative view of a portion of the structure and the safety system of FIGS. 1A-B including one or more levels in which an emergency state occurs, according to one or more embodiments.

FIG. 10 shows a portion of structure 102 including one or more levels (e.g., levels $1002_{1-4}$) in which an emergency state 1050 occurs, according to one or more embodiments. In one or more embodiments, emergency state 1050 may include but is not limited to a fire, smoky condition(s), leakage of piping elements of fixed piping system 104 in the one or more levels and contamination of breathable air 103 in said piping elements. In some embodiments, levels $1002_{1-4}$ may be floor levels within structure 102. For example, level $1002_1$ may be a sixth floor level of structure 102, level $1002_2$ may be a fifth floor level of structure 102, level $1002_3$ may be a fourth floor level of structure 102 and level $1002_4$ may be a third floor level of structure 102. FIG. 10 also illustrates a fire in level $1002_1$ as an example emergency state 1050, although other conditions such as smoke, piping element leaks, piping element cracks and breathable air 103 contamination may also constitute emergency state 1050.

As discussed above, in one or more embodiments, emergency air fill station $120_{1-P}$ may be a static location of access of breathable air 103 by emergency personnel 122 to fill air bottles thereof. In one or more embodiments, each level (e.g., floor level such as a level $1002_{1-4}$) of structure 102 may have an emergency air fill station $120_{1-P}$ therein. In some other embodiments, a level of structure 102 may have multiple emergency air fill stations $120_{1-P}$ thereon. In still some other embodiments, an emergency air fill station $120_{1-P}$ may cover more than one level of structure 102. Thus, to generalize, in one or more embodiments, an emergency air fill station $120_{1-P}$ of structure 102 may be associated with or cover one or more levels (e.g., levels $1002_{1-4}$) therewithin. FIG. 10 also shows an isolation valve $160_{1-3}$ associated with or proximate each emergency air fill station $120_{1-3}$. In FIG. 10, emergency air fill station $120_1$/isolation valve $160_1$ may be associated with (or provide access to breathable air 103 at) level $1002_1$ and/or one or more other levels, emergency air fill station $120_2$/isolation valve $160_2$ may be associated with (or provide access to breathable air 103 at) level $1002_1$, level $1002_2$ and/or level $1002_3$, and emergency air fill station $120_3$/isolation valve $160_3$ may be associated with (or provide access to breathable air 103 at) level $1002_3$, level $1002_4$ and/or one or more other levels.

In one or more embodiments, as seen above, breathable air 103 through safety system 100 including breathable air 103 accessible through emergency air fill stations $120_{1-3}$ may also be received at air monitoring system 150 including air quality analysis device 105 for capturing air quality parameters 190/air quality data 128. In some embodiments, air monitoring system 150 including air quality analysis device 105 may be at multiple locations of structure 102 including one or more of levels $1002_{1-4}$. Similarly, bypass controller device 140 may also be at multiple locations of structure 102 including levels $1002_{1-4}$.

Figure 11:
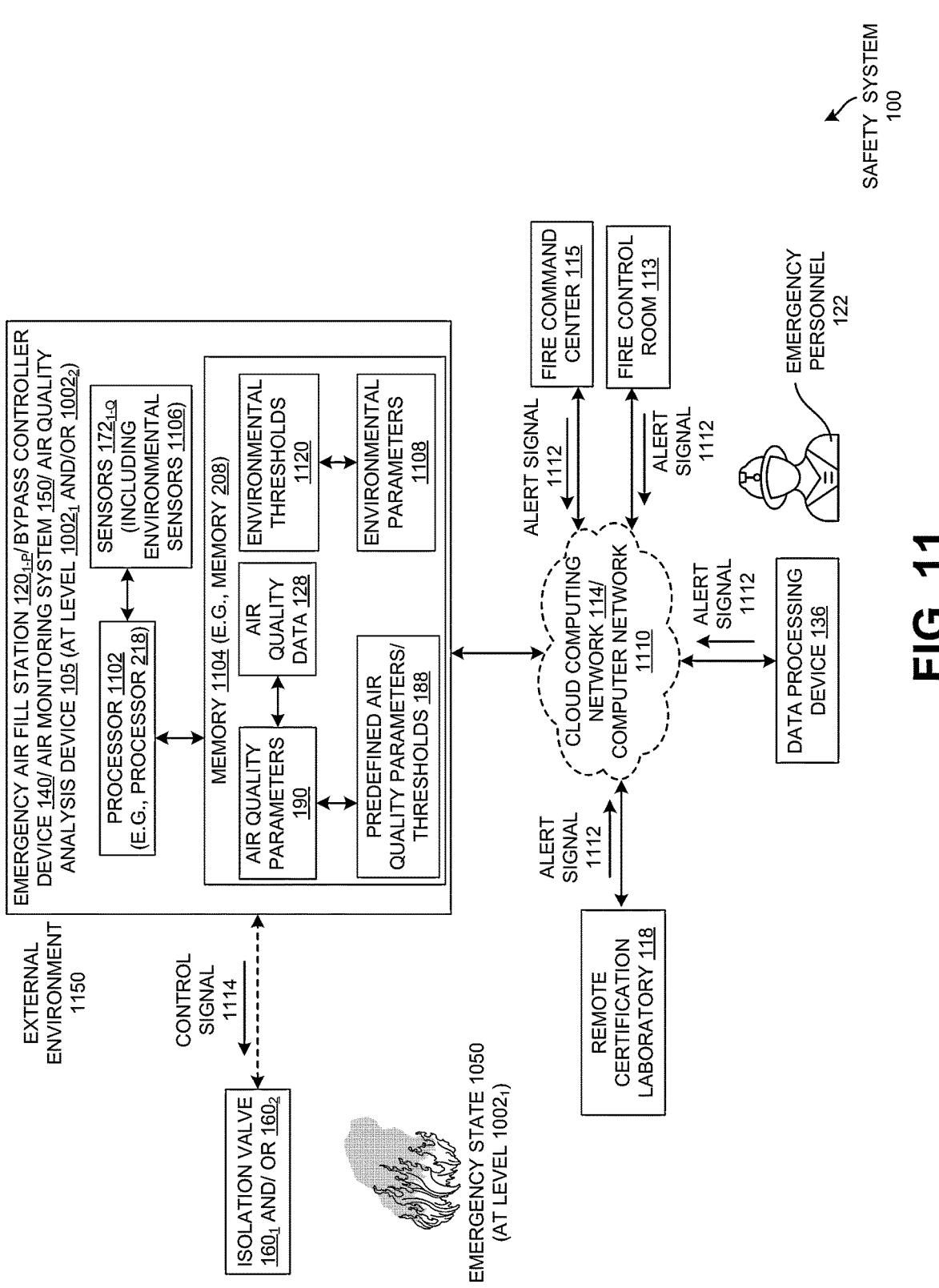
FIG. 11 is a schematic view of an emergency air fill station, a bypass controller device, an air monitoring system and/or an air quality analysis device of the safety system of FIGS. 1A-B with environmental sensors, according to one or more embodiments.

FIG. 11 shows an emergency air fill station $120_{1-P}$/bypass controller device 140/air monitoring system 150/air quality analysis device 105 with environmental sensors 1106, according to one or more embodiments. As discussed above, in one or more embodiments, sensors $172_{1-Q}$ of air quality analysis device 105 of air monitoring system 150 may sense air quality parameters 190. However, in conjunction therewith, in one or more embodiments, emergency air fill station $120_{1-P}$, bypass controller device 140 and/or air monitoring system 150/air quality analysis device 105 may have environmental sensors 1106 therein (or associated therewith) to sense parameters (e.g., environmental parameters $1108$) of an external environment $1150$ in a vicinity of emergency air fill station $120_{1-P}$. As shown in FIG. $11$, environmental sensors $1106$ may be regarded as part of sensors $172_{1-Q}$ for the sake of convenience.

In one or more embodiments, environmental sensors $1106$ may include but are not limited to heat sensors, smoke sensors, leakage sensors (to sense leakage of breathable air $103$ out of piping elements of fixed piping system $104$ at one or more levels $1002_{1-4}$) and light sensors. Accordingly, in one or more embodiments, environmental parameters $1108$ sensed by environmental sensors $1106$ may include but are not limited to temperature/heat levels, smoke levels, leakage levels and light levels. FIG. $11$ shows emergency air fill station $120_{1-P}$/bypass controller device $140$/air monitoring system $150$/air quality analysis device $105$ having a processor $1102$ (e.g., a microprocessor, a microcontroller, a stand-alone processor; e.g., processor $218$ in the case of air quality analysis device $105$) communicatively coupled to a memory $1104$ (e.g., a volatile and/or a non-volatile memory; e.g., memory $208$ in the case of air quality analysis device $105$), according to one or more embodiments. In one or more embodiments, sensors $172_{1-Q}$ including environmental sensors $1106$ may be interfaced with processor $218$.

In one or more embodiments, environmental sensors $1106$ may sense environmental parameters $1108$ continuously (e.g., in real-time). As shown in FIG. $11$, memory $1104$ may include air quality parameters $190$, air quality data $128$, predefined air quality parameters/thresholds $188$ and environmental parameters $1108$, according to one or more embodiments. During emergency state $1050$ at level $1002_1$, for example, one or more environmental sensors $1106$ of emergency air fill station $120_{1-P}$/bypass controller device $140$/air monitoring system $150$/air quality analysis device $105$ at level $1002_1$ and/or level $1002_2$ (in the case of emergency air fill station $120_{1-P}$, specifically, emergency air fill station $120_1$ and/or $120_2$) may detect, in conjunction with processor $1102$ thereof, that one or more environmental parameters $1108$ of external environment $1150$ is outside (e.g., above) one or more environmental thresholds $1120$ (e.g., predefined/predetermined levels/ranges). For example, a temperature/heat level of external environment $1150$ may be outside a predetermined threshold level thereof in the case of a fire as emergency state $1050$, a smoke level of external environment $1150$ may be outside another predetermined threshold level in the case of smoke pollution as emergency state $1050$, and a leakage level of breathable air $103$ in external environment $1150$ may be outside yet another predetermined threshold level in the case of leakage of breathable air $103$ in level $1002_1$ as emergency state $1050$.

Further, in one or more embodiments, one or more sensors $172_{1-Q}$ may sense one or more air quality parameters $190$ and, in conjunction with processor $218$, may determine that the one or more sensed air quality parameters $190$ is above one or more predefined air quality parameters/thresholds $188$ in the case of contamination of breathable air $103$ or anomalous levels of one or more components of breathable air $103$ within piping elements of fixed piping system $104$ at level $1002_1$ constituting emergency state $1050$. In one or more embodiments, the aforementioned sensing through sensors $172_{1-Q}$ including environmental sensors $1106$ may be performed in conjunction with processor $1102$, which may receive data from and/or control sensors $172_{1-Q}$ through appropriate instructions executing thereon.

In one or more embodiments, in response to one or more sensors $172_{1-Q}$/environmental sensors $1106$ sensing air quality parameters $190$/environmental parameters $1108$ and determining, in conjunction with processor $1102$ (e.g., processor $218$), that the one or more air quality parameters $190$/environmental parameters $1108$ in one or more levels (e.g., level $1002_1$) of structure $102$ is outside a corresponding one or more predefined air quality parameters/thresholds $188$/environmental thresholds $1120$, processor $1102$ of emergency air fill station $120_{1-P}$/bypass controller device $140$/air monitoring system $150$/air quality analysis device $105$ at the same or another one or more levels (e.g., level $1002_1$ and/or level $1002_2$) may transmit a control signal $1114$ to automatically close one or more isolation valves (e.g., isolation valve $160_1$ and/or isolation valve $160_2$) associated with the same or the another one or more levels to isolate breathable air $103$ supplied to the one or more levels (e.g., level $1002_1$). In one or more embodiments, isolation valves $160_{1-P}$ may thus be electrically and/or electronically operable and/or controllable.

In one or more other embodiments, remote certification laboratory $118$, data processing device $136$ associated with emergency personnel $122$, fire control room $113$ and/or fire command center $115$ may, based on communication with processor $1102$ of emergency air fill station $120_{1-P}$/bypass controller device $140$/air monitoring system $150$/air quality analysis device $105$ via a computer network $1110$ (e.g., a Wide Area Network (WAN), a Local Area Network (LAN) and/or a short-range communication network) and/or cloud computing network $114$, transmit an alert signal $1112$ (e.g., analogous to alert signal $194$) to processor $1102$ of emergency air fill station $120_{1-P}$/bypass controller device $140$/air monitoring system $150$/air quality analysis device $105$ to trigger the transmission of control signal $1114$ to automatically close the one or more isolation valves discussed above upon the determination that the one or more air quality parameters $190$/environmental parameters $1108$ is outside the corresponding one or more predefined air quality parameters/thresholds $188$/environmental thresholds $1120$.

Exemplary embodiments discussed herein are not limited to isolation valves $160_{1-P}$ being closed to isolate breathable air $103$ supplied to the one or more level(s) of structure $102$ discussed above. Other kinds of valves/valve implementations and automatic closure thereof are within the scope of the exemplary embodiments discussed herein. In one or more embodiments, the isolation of breathable air $103$ supplied to the one or more level(s) may prevent breathable air $103$ supplied to the other level(s) from being contaminated and/or ensure that non-firefighting/rescuing emergency personnel $122$ do not access (e.g., based on updates thereto through data processing device $136$ via cloud computing network $114$/computer network $1110$) the one or more level(s). In one or more embodiments, the one or more emergency air fill station(s) $120_{1-P}$ corresponding to the automatically closed one or more isolation valve(s) $160_{1-P}$ may be automatically cut off from the supply of breathable air $103$ from air storage system $106$/compressed air source $108$/another compressed air source $109$. Further, in one or more embodiments, the isolation of breathable air $103$ supplied to the one or more level(s) may facilitate the automatic bypass of air storage system $106$/compressed air source $108$/another compressed air source $109$ in the case of emergency state $1050$ being detected at most or all levels of structure $102$. This, in one or more embodiments, may, in turn, facilitate the automatic purging of the isolated breathable air $103$. All reasonable variations are within the scope of the exemplary embodiments discussed herein.

Figure 12:
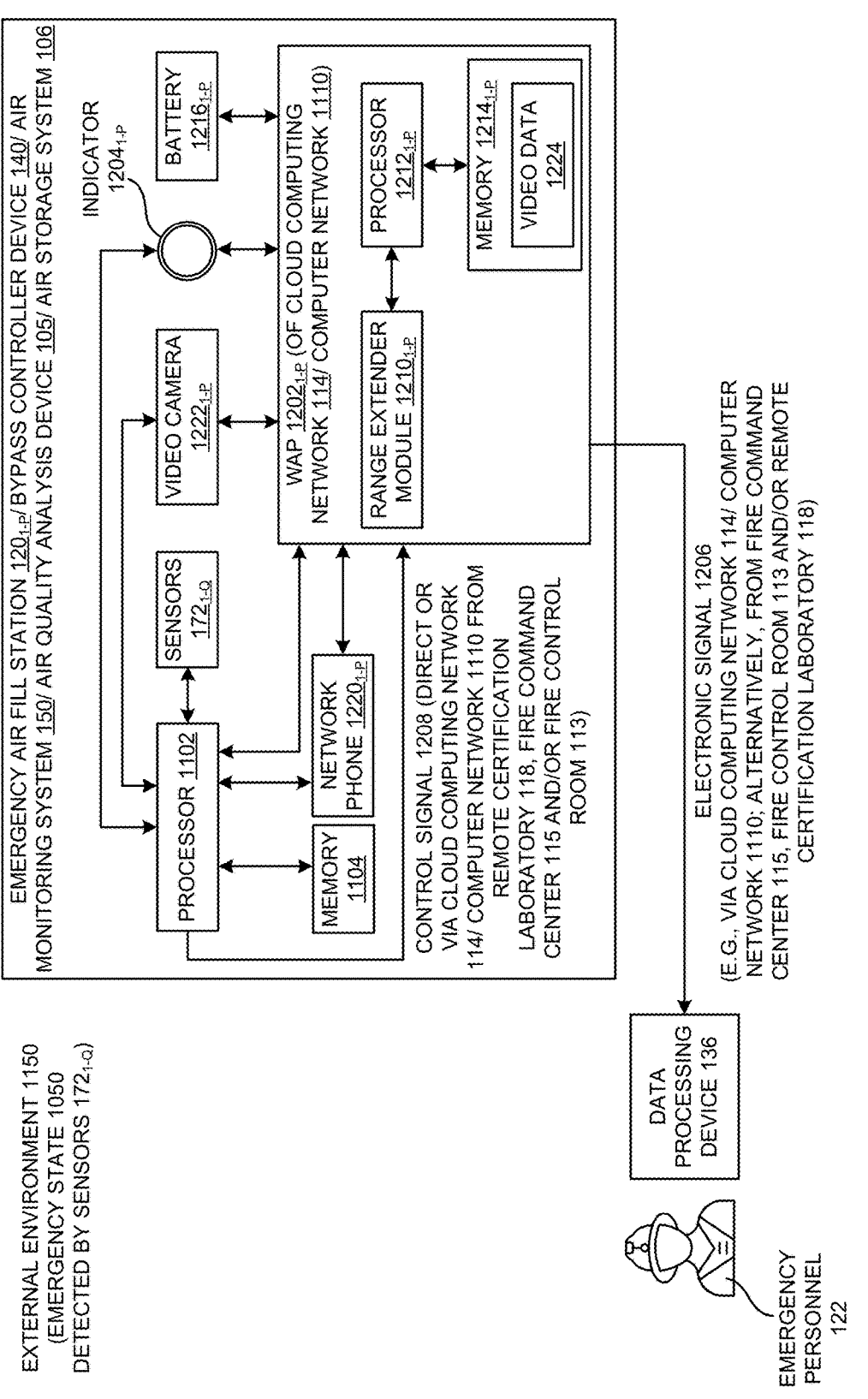
FIG. 12 is a schematic view of the emergency air fill station, the bypass controller device, the air monitoring system and/or the air quality analysis device of the safety system of FIGS. 1A-B and FIG. 11 and/or air storage system 106 thereof with a Wireless Access Point (WAP) therein, according to one or more embodiments.

FIG. $12$ shows emergency air fill station $120_{1-P}$ of FIGS. 1A-B, $2$, $7$, $10$ and $11$ with a wireless access point (WAP) $1202_{1-P}$ therein, according to one or more embodiments. In addition, as shown in FIG. 12, in one or more embodiments, emergency air fill station 120$_{1-P}$ may include one or more indicator(s) (e.g., indicator 12041-P that may be a visual, a text and/or an audio indicator; indicator 12041-P may be a display device and/or an alarm device to indicate the corresponding visual(s), text and/or audio) thereon to indicate visually, textually and/or audibly accessibility of WAP 1202$_{1-P}$ to emergency personnel 122 in a vicinity thereof. Particularly, in one or more embodiments, indicator 12041-P may indicate accessibility of WAP 1202$_{1-P}$ during emergency state 1050, i.e., a state detected based on detecting/determining the appropriate parameter(s) discussed above via sensor(s) 172$_{1-Q}$ (e.g., including environmental sensors 1106). All discussions relevant to FIGS. 1-11 are also applicable to the embodiments of FIGS. 12-13. Additionally or alternatively, in one or more embodiments, emergency state 1050 may cause WAP 1202$_{1-P}$, fire command center 115, fire control room 113 and/or remote certification laboratory 118 to transmit a notification and/or an electronic signal (e.g., electronic signal 1206 via cloud computing network 114/computer network 1110) indicative of the accessibility of WAP 1202$_{1-P}$ to data processing device 136 of emergency personnel 122. Additionally, indicator 12041-P may be utilizable for identification of emergency air fill station 120$_{1-P}$ during emergency state 1050 (e.g., loss of visibility) based on indicator 12041-P including a thermal imaging camera (TIC), one or more glow locator(s), one or more strobe light(s) and/or one or more alarm device(s), according to one or more embodiments. More than one emergency air fill station 120$_{1-P}$ within safety system 100 may include the implementation thereof in FIG. 12, thus providing for multiple WAPs 1202$_{1-P}$ within safety system 100. Particularly, in one or more embodiments, emergency air fill stations 120$_{1-P}$ around locations of low (or, suboptimal) network (e.g., Internet, via cloud computing network 114/computer network 1110 in general) connectivity such as a stairwell, a basement, a roof and/or an interior cavity of structure 102 may be provided with WAPs 1202$_{1-P}$. Also, in one or more embodiments, as indicated in FIG. 12, WAP 1202$_{1-P}$ may also be provided within air monitoring system 150, bypass controller device 140, air quality analysis device 105 and/or air storage system 106. Other provisions of WAP 1202$_{1-P}$ across safety system 100 are within the scope of the exemplary embodiments discussed herein.

Further, the WAP 1202$_{1-P}$ may not necessarily be provided within emergency air fill station 120$_{1-P}$, air monitoring system 150, bypass controller device 140, air quality analysis device 105 and/or air storage system 106. In some implementations or embodiments, WAP 1202$_{1-P}$ may be external to and/or in a vicinity of emergency air fill station 120$_{1-P}$, air monitoring system 150, bypass controller device 140, air quality analysis device 105 and/or air storage system 106. Thus, to generalize, in one or more embodiments, WAP 1202$_{1-P}$ (and even indicator 12041-P) may be associated with emergency air fill station 120$_{1-P}$, air monitoring system 150, bypass controller device 140, air quality analysis device 105 and/or air storage system 106. All reasonable variations are within the scope of the exemplary embodiments discussed herein. In one or more embodiments, emergency personnel 122 may also be associated with mobile air unit 110, e.g., by way of arriving at/departing from structure 102 therethrough; as seen in FIG. 1, mobile air unit 110 may also be part of safety system 100. Thus, in one or more embodiments, WAP 1202$_{1-P}$ may improve communication between multiple emergency personnel 122 with individual data processing devices (e.g., data processing device 136 such as a mobile device) across safety system 100. In one or more embodiments, at least a subset of WAPs 1202$_{1-P}$ within safety system 100 may be activated when emergency state 1050 is detected via sensor(s) 172$_{1-Q}$. In one or more embodiments, once emergency state 1050 is detected, emergency air fill station 120$_{1-P}$ (e.g., processor 1102 thereof), air monitoring system 150, air storage system 106 (e.g., may also have a processor and/or sensor(s) 172$_{1-Q}$ for parameter detection), air quality analysis device 105, bypass controller device 140, remote certification laboratory 118, fire command center 115 and/or fire control room 113 may transmit an appropriate control signal (e.g., control signal 1208) directly or via cloud computing network 114 to activate WAP 1202$_{1-P}$ in emergency state 1050 in order to improve communication between multiple emergency personnel 122 associated with safety system 100.

In some embodiments, the activation of WAP 1202$_{1-P}$ in emergency state 1050 may provide for Internet access (e.g., via cloud computing network 114/computer network 1110, or access to cloud computing network 114/computer network 1110) to data processing device 136 and other data processing devices within a vicinity (e.g., external environment 1150) of WAP 1202$_{1-P}$ (or, emergency air fill station 120$_{1-P}$) without a password/secure password; in other words, unsecured Internet access (e.g., via cloud computing network 114/computer network 1110, or access to cloud computing network 114/computer network 1110) may be provided to data processing device 136 and the other data processing devices within the vicinity of WAP 1202$_{1-P}$ in emergency state 1050. In some implementations, unsecured Internet access may be provided to data processing device 136 and/or other data processing devices associated with emergency personnel 122 solely upon detection of emergency state 1050. In some other implementations, WAP 1202$_{1-P}$ may be operational (e.g., activated based on control signal 1208; always operational) even during non-emergencies in safety system 100; however, in one or more embodiments, during non-emergencies (e.g., during normal operation of safety system 100 in which parameter(s) discussed above are within predetermined thresholds, good network connectivity), data processing device 136 and other data processing devices (e.g., authorized data processing devices associated with other emergency personnel 122) may be able to access the Internet only by using a secure password. Again, here, this may be transitioned (e.g., using control signal 1208) into unsecured Internet access during emergency state 1050.

In one or more embodiments, WAP 1202$_{1-P}$ may be a networking device within cloud computing network 114/computer network 1110 employed to forward Internet connection(s) to all devices (e.g., data processing device 136, other authorized/unauthorized data processing devices) connected thereto within safety system 100; access to the Internet and/or another private computer network within cloud computing network 114/computer network 1110 may thus be provided through WAP 1202$_{1-P}$. FIG. 13 shows fire control room 113/fire command center 115 in an example implementation thereof. Here, fire control room 113/fire command center 115 may be a fire-rated control room/center within structure 102 that enables emergency personnel 122 to monitor (e.g., continuously) and/or control (e.g., in real-time) components of safety system 100. In some implementations, fire control room 113/fire command center 115 may authenticate (e.g., entry, password-based authentication of data processing device 136) emergency personnel 122 and/or authorize access of various components of safety system 100.

FIG. 13 shows fire control room 113/fire command center 115 as including a data processing device 1302 (e.g., a server) communicatively coupled to other components (e.g., air storage system 106, emergency air fill station $120_{1-P}$, air monitoring system 150, air quality data analysis device 105, bypass controller device 140, data processing device 136) of safety system 100 through cloud computing network 114/computer network 1110. Additionally, fire control room 113/fire command center 115 may also include an intermediary communication system 1304 therein to mediate access of the Internet from an Internet Service Provider (ISP) via WAP $1202_{1-P}$ (e.g., associated with emergency air fill station $120_{1-P}$). In some implementations, intermediary communication system 1304 may include a modem 1306 and a router 1308 communicatively coupled thereto. Modem 1306 may be a hardware device to connect cloud computing network 114/computer network 1110 to the ISP, and router 1308 may be a device to facilitate utilization of the connection of cloud computing network 114/computer network 1110 to the ISP at once by all wired and/or wireless components (e.g., emergency air fill station $120_{1-P}$, air monitoring system 150, air storage system 106, air quality analysis device 105, bypass controller device 140, data processing device 136, data processing device 1302) of safety system 100; thereby, the aforementioned all wired and/or wireless components of safety system 100 may access the Internet.

Thus, intermediary communication system 1304 (e.g., controlled by data processing device 1302) may enable reception of information/data and transmission thereof from and to the Internet (e.g., cloud computing network 114/ computer network 1110 or via cloud computing network 114/computer network 1110) respectively. In one or more embodiments, intermediary communication system 1304 may enable access of the Internet/cloud computing network 114/computer network 1110 to all/authorized devices/components within safety system 100. In one or more embodiments, as discussed above, based on activation of WAP $1202_{1-P}$, intermediary communication system 1304 may provide for enhanced (or, backup) access to Internet/cloud computing network 114/computer network 1110 in a vicinity of WAP $1202_{1-P}$; data processing device 136 and other authorized/unauthorized data processing devices of emergency personnel 122 in the vicinity of WAP $1202_{1-P}$ may thus utilize Internet/cloud computing network 114/computer network 1110 to communicate with one another during emergency state 1050 and/or non-emergencies. Emergency state 1050 may also include but is not limited to slow network speed, weak communication signals, intermittent breaks in communication and drops in network signals with regard to cloud computing network 114/computer network 1110 in addition to the examples discussed above.

Thus, in one or more embodiments, each WAP $1202_{1-P}$ may provide for an automatic WiFi® "hotspot" within structure 102. In one or more embodiments, depending on the extent of structure 102, safety system 100 may have a number of network signal extender devices (e.g., at/associated with multiple WAPs $1202_{1-P}$, at/associated with fire control room 113/fire command center 115) distributed thereacross. Specifically, in one or more embodiments, these network signal extender devices may cover all areas (e.g., stairways, hallways) in which emergency personnel 122 are likely to require (or, demand) access to Internet/cloud computing network 114/computer network 1110. In one or more embodiments, the aforementioned network signal extender devices may amplify signals to improve clarity in communication between data processing device(s) 136 of emergency personnel 122.

Referring back to FIG. 12, in some embodiments, WAP $1202_{1-P}$ may include a range extender module $1210_{1-P}$ (e.g., a device/module integrated with or associated with WAP $1202_{1-P}$) to improve coverage area of communication signals, to provide for signal amplification and/or to increase robustness of communication between WAPs $1202_{1-P}$ within safety system 100. In one or more embodiments, range extender module $1210_{1-P}$ may receive signals from router 1308 (e.g., via cloud computing network 114/computer network 1110) and/or WAP $1202_{1-P}$ and retransmit data therefrom to wireless endpoints within safety system 100 that otherwise cannot exchange data efficiently with router 1308 and/or WAP $1202_{1-P}$ directly.

Processor 1102 of emergency air fill station $120_{1-P}$/bypass controller device 140/air monitoring system 150/air quality analysis device 105/air storage system 106 or another local processor (e.g., $2323_{1-P}$ communicatively coupled to memory $1214_{1-P}$) of WAP $1202_{1-P}$ may control (e.g., in conjunction with intermediary communication system 1304) functionalities (e.g., including activation of WAP $1202_{1-P}$) of WAP $1202_{1-P}$. In addition, in one or more embodiments, WAP $1202_{1-P}$ may include a battery $1216_{1-P}$ as a backup (e.g., instantaneous) and/or uninterruptible power source thereto.

In one or more embodiments, one or more component(s) (e.g., emergency air fill station $120_{1-P}$, air monitoring system 150, air storage system 106, bypass controller device 140, air quality analysis device 105) of safety system 100 including WAP $1202_{1-P}$ may include a network phone (e.g., network phone $1220_{1-P}$ of emergency air fill station $120_{1-P}$) associated (e.g., on emergency air fill station $120_{1-P}$) therewith; network phone $1220_{1-P}$ may be operable during activity of WAP $1202_{1-P}$ and/or router 1308 without a requirement of a separate data processing device such as a mobile phone for communication. Additionally, in one or more embodiments, said one or more components (e.g., emergency air fill station $120_{1-P}$) including WAP $1202_{1-P}$ may also include a video camera 12221-P associated therewith to automatically communicate video data (e.g., video data 1224 stored in memory $1214_{1-P}$) associated with an environment (e.g., external environment 1150) within a vicinity of WAP $1202_{1-P}$ to fire control room 113/fire command center 115/remote certification laboratory 118; the automatic communication of video data 1224 may occur when WAP $1202_{1-P}$ is activated. All reasonable variations are within the scope of the exemplary embodiments discussed herein.

FIG. 14 shows a process flow diagram detailing the operations involved in network access point based improved communication between emergency personnel (e.g., emergency personnel 122) in a safety system (e.g., safety system 100) of a structure (e.g., structure 102) having breathable air (e.g., breathable air 103) supplied thereacross, according to one or more embodiments. In one or more embodiments, the safety system of the structure may include a fixed piping system (e.g., fixed piping system 104) implemented therein to supply the breathable air from a source (e.g., within air storage system 106) across the safety system. In one or more embodiments, operation 1402 may involve automatically activating a network access point (e.g., WAP $1202_{1-P}$) within the safety system upon detecting an emergency state (e.g., emergency state 1050) within the safety system. In one or more embodiments, the emergency state may affect supply of the breathable air to the emergency personnel within the safety system.

In one or more embodiments, operation 1404 may then involve providing, to one or more data processing device(s) (e.g., data processing device 136) associated with the emergency personnel, access to communication through a computer network (e.g., cloud computing network 114/computer network 1110) of the safety system during the emergency state in accordance with the automatic activation of the network access point.

Although the present embodiments have been described with reference to specific example embodiments, it will be evident that various modifications and changes may be made to these embodiments without departing from the broader spirit and scope of the various embodiments.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A method of a safety system of a structure having a fixed piping system installed therewithin to supply breathable air from a source across the safety system, comprising:

automatically activating a network access point within the safety system upon detecting an emergency state within the safety system, the emergency state affecting supply of the breathable air to emergency personnel within the safety system; and providing, to at least one data processing device associated with the emergency personnel, access to communication through a computer network of the safety system during the emergency state in accordance with the automatic activation of the network access point.

2. The method of claim 1, comprising:

automatically activating the network access point within the safety system based on a control signal from at least one component of the safety system upon the detection of the emergency state based on at least one parameter of at least one of: the breathable air and an environment of the at least one component sensed by at least one sensor associated therewith.

3. The method of claim 2, comprising:

the at least one component being at least one of: an emergency air fill station providing access to the breathable air therethrough, an air monitoring system sensing the at least one parameter from the breathable air, an air storage system comprising the source of the breathable air, a bypass controller device and another data processing device communicatively coupled to the network access point through the computer network.

4. The method of claim 2, comprising:

the network access point being associated with the at least one component of the safety system, and the automatic activation of the network access point providing for an improvement in the access to the communication through the computer network to the at least one data processing device at least in a vicinity of at least one of: the network access point and the at least one component.

5. The method of claim 1, comprising:

providing, to the at least one data processing device associated with the emergency personnel, access to the communication through the computer network of the safety system solely upon the detection of the emergency state.

6. The method of claim 1, comprising at least one of:

the access to the communication through the computer network of the safety system provided to the at least one data processing device during the emergency state in accordance with the automatic activation of the network access point being an unsecured form thereof; and the network access point providing a secured form of the access to the communication through the computer network of the safety system to the at least one data processing device otherwise.

7. The method of claim 1, comprising at least one of:

visually and audibly indicating the provided access to the communication through the computer network of the safety system to the at least one data processing device during the emergency state.

8. The method of claim 1, comprising:

providing the network access point in a location of the structure offering sub-optimal connectivity to the computer network to the at least one data processing device.

9. The method of claim 1, further comprising at least one of:

providing a network phone operable during activity of the network access point without a requirement of the at least one data processing device; and providing a video camera to automatically communicate video data associated with a vicinity of the network access point to a remote data processing device through the computer network.

10. A method of a safety system of a structure having a fixed piping system installed therewithin to supply breathable air from a source across the safety system, comprising:

automatically activating a network access point within the safety system associated with a component thereof upon detecting an emergency state within the safety system, the emergency state affecting supply of the breathable air to emergency personnel within the safety system via the component; and providing, to at least one data processing device associated with the emergency personnel, access to communication through a computer network of the safety system in a vicinity of at least one of: the component and the network access point during the emergency state in accordance with the automatic activation of the network access point.

11. The method of claim 10, comprising:

automatically activating the network access point within the safety system based on a control signal from at least one of: the component of the safety system and another component thereof upon the detection of the emergency state based on at least one parameter of at least one of: the breathable air and an environment of the at least one of: the component and the another component sensed by at least one sensor associated therewith.

12. The method of claim 11, comprising:

the component being one of: an emergency air fill station providing access to the breathable air therethrough, an air monitoring system sensing the at least one parameter from the breathable air, an air storage system comprising the source of the breathable air, a bypass controller device and another data processing device communicatively coupled to the network access point through the computer network.

13. The method of claim 10, comprising:

the automatic activation of the network access point providing for an improvement in the access to the communication through the computer network to the at least one data processing device at least in the vicinity of the at least one of: the component and the network access point.

14. The method of claim 10, comprising at least one of:

the access to the communication through the computer network of the safety system provided to the at least one data processing device during the emergency state in accordance with the automatic activation of the network access point being an unsecured form thereof; and the network access point providing a secured form of the access to the communication through the computer network of the safety system to the at least one data processing device otherwise.

15. The method of claim 10, further comprising at least one of:

providing a network phone operable during activity of the network access point without a requirement of the at least one data processing device; and providing a video camera to automatically communicate video data associated with the vicinity of the at least one of: the component and the network access point to a remote data processing device through the computer network.

16. A safety system of a structure, comprising:

a fixed piping system installed within the structure to supply breathable air from a source across the safety system;

a network access point to automatically activate upon detection of an emergency state within the safety system, the emergency state affecting supply of the breathable air to emergency personnel within the safety system; and at least one data processing device associated with the emergency personnel, to which access to communication through a computer network of the safety system is provided during the emergency state in accordance with the automatic activation of the network access point.

17. The safety system of claim 16, wherein the network access point is automatically activated based on a control signal from at least one component of the safety system upon detection of the emergency state based on at least one parameter of at least one of: the breathable air and an environment of the at least one component sensed by at least one sensor associated therewith.

18. The safety system of claim 17, wherein at least one of:

the at least one component is at least one of: an emergency air fill station providing access to the breathable air therethrough, an air monitoring system sensing the at least one parameter from the breathable air, an air storage system comprising the source of the breathable air, a bypass controller device and another data processing device communicatively coupled to the network access point through the computer network, and the network access point is associated with the at least one component, and the automatic activation of the network access point provides for an improvement in the access to the communication through the computer network to the at least one data processing device at least in a vicinity of at least one of: the network access point and the at least one component.

19. The safety system of claim 16, wherein at least one of:

the access to the communication through the computer network of the safety system provided to the at least one data processing device during the emergency state in accordance with the automatic activation of the network access point is an unsecured form thereof, the network access point provides a secured form of the access to the communication through the computer network of the safety system to the at least one data processing device otherwise, and the network access point is provided in a location of the structure offering sub-optimal connectivity to the computer network to the at least one data processing device.

20. The safety system of claim 16, further comprising at least one of:

a network phone operable during activity of the network access point without a requirement of the at least one data processing device; and a video camera to automatically communicate video data associated with a vicinity of the network access point to a remote data processing device through the computer network.

\* \* \* \* \*